(12) United States Patent
Tesar

(10) Patent No.: US 11,592,081 B2
(45) Date of Patent: Feb. 28, 2023

(54) LOW COST SPIN ACTUATORS

(71) Applicant: FATHOM5 CORPORATION, Austin, TX (US)

(72) Inventor: Delbert Tesar, Austin, TX (US)

( * ) Notice: Subject to any disclaimer, the term of this patent is extended or adjusted under 35 U.S.C. 154(b) by 61 days.

(21) Appl. No.: 16/179,881

(22) Filed: Nov. 2, 2018

(65) Prior Publication Data

US 2019/0242456 A1 Aug. 8, 2019

Related U.S. Application Data

(60) Provisional application No. 62/581,027, filed on Nov. 2, 2017.

(51) Int. Cl.
*F16H 1/28* (2006.01)
*H02K 7/116* (2006.01)

(52) U.S. Cl.
CPC ............... *F16H 1/28* (2013.01); *H02K 7/116* (2013.01); *F16H 2001/2872* (2013.01)

(58) Field of Classification Search
CPC ................................. F16H 1/28; H02K 7/116
See application file for complete search history.

(56) References Cited

U.S. PATENT DOCUMENTS 10,024,390 B2 * 7/2018 Liang .................... H02K 7/116

* cited by examiner

*Primary Examiner* — Derek D Knight
(74) *Attorney, Agent, or Firm* — John A. Fortkort; Fortkort & Houston PC

(57) ABSTRACT

An actuator is provided which includes a stationary frame; an output plate disposed within said stationary frame; a top plate; a stator disposed between said stationary frame and said top plate, said stator describing an annulus; a rotor disposed within the annulus of said stator; a principal bearing disposed between said stationary frame and said output plate; a pinion gear; and a star gear which meshes with said pinion gear.

10 Claims, 28 Drawing Sheets

(a) Typical splined connector  (b) Standard straight spline cross sections

| Gear Details | |
|---|---|
| Pressure Angle | 25 Degrees |
| Diametral Pitch | 30 |
| Teeth Count | 48 |
| Tooth Thickness | 0.0524 in |
| Face Width | 0.4 in |
| Addendum | 0.0333 in |
| Dedendum | 0.0417 in |
| Root Diameter | 1.5167 in |
| Base Diameter | 1.4501 in |
| Pitch Diameter | 1.6 in |
| Outside Diameter | 1.6667 in |
| Whole Depth | 0.075 in |
| Working Depth | 0.0667 in |
| Clearance | 0.0083 in |

| Gear Details | |
|---|---|
| Pressure Angle | 25 Degrees |
| Diametral Pitch | 30 |
| Teeth Count | 12 |
| Tooth Thickness | 0.0524 in |
| Face Width | 0.3 in |
| Addendum | 0.0333 in |
| Dedendum | 0.0417 in |
| Root Diameter | 0.3167 in |
| Base Diameter | 0.3625 in |
| Pitch Diameter | 0.4 in |
| Outside Diameter | 0.4667 in |
| Whole Depth | 0.075 in |
| Working Depth | 0.0667 in |
| Clearance | 0.0083 in |

| Gear Details | |
|---|---|
| Pressure Angle | 25 Degrees |
| Diametral Pitch | 22.5 |
| Teeth Count | 15 |
| Tooth Thickness | 0.0698 in |
| Face Width | 0.4 in |
| Addendum | 0.0444 in |
| Dedendum | 0.0556 in |
| Root Diameter | 0.5556 in |
| Base Diameter | 0.6042 in |
| Pitch Diameter | 2/3 in |
| Outside Diameter | 0.7556 in |
| Whole Depth | 0.1 in |
| Working Depth | 0.08889 in |
| Clearance | 0.01111 in |

| Gear Details | |
|---|---|
| Pressure Angle | 25 Degrees |
| Diametral Pitch | 22.5 |
| Teeth Count | 60 |
| Tooth Thickness | 0.0698in |
| Face Width | 0.4 in |
| Addendum | 0.0444 in |
| Dedendum | 0.0556 in |
| Root Diameter | 2.5556 in |
| Base Diameter | 2.4168 in |
| Pitch Diameter | 2.6667 in |
| Outside Diameter | 2.7556 in |
| Whole Depth | 0.1 in |
| Working Depth | 0.08889 in |
| Clearance | 0.01111 in |

LOW COST SPIN ACTUATORS

CROSS-REFERENCE TO RELATED APPLICATIONS

The present application claims priority to U.S. Provisional Application No. 62/581,027, filed on Nov. 2, 2017, which has the same title and the same inventor, and which is incorporated herein by reference in its entirety.

FIELD OF THE DISCLOSURE

The present disclosure relates generally to mechanical actuators and devices incorporating the same, and more particularly to low cost spin actuators.

BACKGROUND OF THE DISCLOSURE

Various improvements have been made recently in the art of rotary actuators. These include, for example, the advances described in U.S. 2008/0257088 (Tesar), entitled "Manufacture And Use Of Parallel Eccentric Electro-Mechanical Actuator"; U.S. 2007/0249457 (Tesar), entitled "Self-Contained Rotary Actuator"; U.S. US2004/0102274 (Tesar), entitled "Standardized Rotary Actuator"; U.S. 2015/0354667 (Tesar), entitled "Modified Parallel Eccentric Rotary Actuator"; U.S. 2014/0224064 (Tesar), entitled "Rotary Actuator With Shortest Force Path Configuration"; U.S. 2016/0091054 (Tesar), entitled "Compact Parallel Eccentric Rotary Actuator"; and U.S. 2017/0271948, entitled "Simplified Parallel Eccentric Rotary Actuator".

Various applications of the foregoing actuators have been described. These include, for example, the applications described in U.S. 2016/0138679 (Tesar), entitled "Spring Augmented Orthotic Or Prosthetic Equipped With A Compact Parallel Eccentric Actuator"; U.S. 2014/0246893 (Tesar), entitled "Multi-Speed Hub Drive Wheels"; and U.S. 2015/0292601, entitled "Standardized Gear Train modules For Multi-Speed Hub Drive Wheels".

SUMMARY OF THE DISCLOSURE

Figure 1:
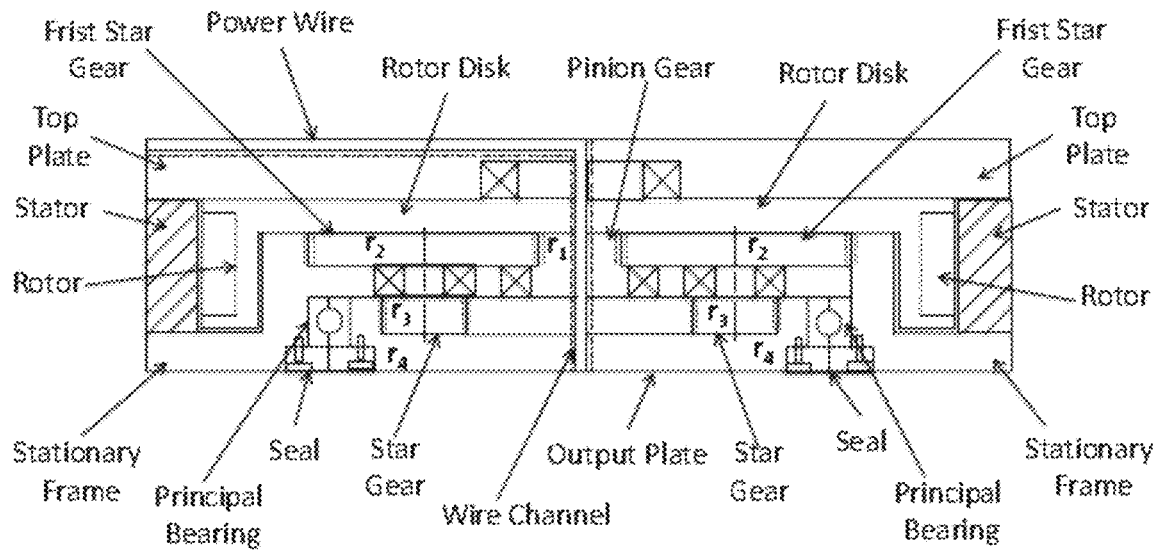
FIG. 1 is an illustration of a pancake actuator based on star compound gear principles.

In one aspect, an actuator is provided which comprises a stationary frame; an output plate disposed within said stationary frame; a top plate; a stator disposed between said stationary frame and said top plate, said stator describing an annulus; a rotor disposed within the annulus of said stator; a principal bearing disposed between said stationary frame and said output plate; a pinion gear; and a star gear which meshes with said pinion gear.

DETAILED DESCRIPTION

A first portion of the present disclosure provides an overview of a unique multi-purpose pancake actuator with a 4 to 1 aspect ratio with the objective to meet an extremely broad range of low-cost applications in domains affecting low-cost production fettling, human support and assist (orthotics), and intelligent system components (cars, drones, robotics etc.).

A second portion of the present disclosure discloses a prototype spin actuator which, in a particular embodiment, has outer dimensions of 7.32" by 1.95", and which is preferably structured to carry a heavy vertical load with a low output torque at very low cost. Design stress for the gears are preferably very low to enable low-cost production. Most bearings are standard and mounted in fixed wall structures. The brushless DC (BLDC) motor in a particular, non-limiting embodiment is designed at 0.2 to 0.3 ft.-lb./lb. for very low cost.

A third portion of the present disclosure provides a carefully developed set of working drawings to enable a one-off prototype for proof of principle testing. All dimensions are based on best judgment with the intent to enable a practiced machine shop to produce and assemble the prototype. Given satisfactory test results, 4 more would be built to drive a next generation platform weighting up to 2000 lb. with a 500 lb. load on each corner.

It is a goal of the present disclosure to provide a large population of low cost, standardized, and highly certified electro-mechanical actuators to populate most applications of daily importance to humans (cars, trucks, orthotics, construction systems, handling systems, robotics, etc.). These fully scalable modules with quick-change interfaces (made available by a responsive supply chain) may enable the rapid assembly, repair and refreshment of a very wide range of open architecture systems of ever-improving performance-to-cost ratios.

Actuator development has been pursued over the last several decades at all levels of technical depth for both rotary and linear output motions. The lowest cost actuators may ultimately be the most economically important. To make such actuators, standard gear and bearing manufacture is advisable. Nonetheless, the standard epicyclic gear train is not useful because it contains too many bearings, a rotating high inertia gear cage, and an excess of structure to maintain the gear alignments under high load or inertia forces. Despite this, the epicyclic gear train does represent some useful features, which include concentricity about a central axis and mutually supportive planet gears meshing with central sun gears. This concentricity keeps all forces balanced about the central axis, reduces or eliminates out-of-plane moments, and places low force/moments on the gear train shell structure. Also, the moving cage structure enables the planets to mesh with a stationary internal gear in the actuator shell. With care, this arrangement enables reductions of 40 up to 60-to-1 in a two-plane configuration.

One problem with the epicyclic gear train is the high cage inertia, the excess of bearings, and the centrifugal forces of the planets on their bearings, all of which leads to higher deformations, more noise, more wear, more backlash, and other infirmities. These issues may be remedied by requiring that all planet bearings be fixed (stationary) in strong/rugged cross plates (or what may be called strong back walls) which join the outer cylindrical shell to the central gear axis to make a remarkably rugged and shock resistant structure. All bearings in such a structure are preferably low velocity bearings, except for the critical input pinion which is usually driven by a high-speed prime mover. The star compound, therefore, has star gears not planet gears. These star gears have fixed axes, and may have one or two planes. Embodiments having two planes enable the use of a clutch in between to change the reduction ratios (as in two-speed drive wheels on vehicles). The star gear axes may then be extended through a strong back wall to a third plane of star gears to drive an internal output gear which provides a further reduction of about 6-to-1. Altogether, this 3-plane star gear may provide reductions of 40 up to 60-to-1 in a very compact package. The last "internal" gear is the output, which is preferably supported by a very stiff/compact large diameter/small cross-section bearing. This bearing may be a ball bearing, a cross-roller bearing, or a grooved roller bearing, progressively with higher load capacity in a lower volume. The foregoing features make the star compound gear train superior to the epicyclic gear train in many applications.

TABLES 1 & 2 represent all the positive attributes of the star compound gear train in a very thin pancake configuration. It also includes an electric prime mover (which is preferably a BLDC) in the same shell to make it into a fully integrated actuator. The stator of the BLDC becomes the rugged outer structure of the actuator joining the two strong back walls (the top plate and the stationary frame), and which holds all of the principal bearings in the actuator.

The large diameter rotor is disposed inside the stator and is equipped with a rotor disk that is supported by two central axis bearings. Generally, this rotor produces a high torque at relatively low speeds (e.g., 700 RPM). The rotor disk is connected directly to the pinion gear $r_1$ with an axis supported by a bearing in the top plate and the stationary frame. The pinion gear $r_1$ drives the fixed star gears $r_2$ (in some embodiments there are 3 such gears) which are concentric with the central axis of the actuator. The star gears are supported by bearings in the stationary frame, which in turn is connected to the stator shell.

Each star gear axis contains two gears $r_2$, $r_3$ which are rigidly connected to each other. Gears $r_1$, $r_2$ are in plane 1 and gears $r_3$, $r_4$ are in plane 2 of the star compound gear train. Gear $r_3$ then drives internal gear $r_4$, which is a rigid part of the output plate. Gear $r_4$ is supported by a large diameter small crossection (and low cost) principal bearing (in this case, a ball bearing). This principal bearing may carry 3× (or more) thrust load than radial load, since all balls (in some embodiments, there are many) simultaneously work to carry the thrust load.

In order to work in a quiet environment (which requires the actuator to operate with very little noise), it is recommended that star gears $r_2$ be high quality plastic nylon gears. In a preferred embodiment, the top plate plugs into the supporting structure (of the supporting platform) with a quick-change interface (both mechanically and electrically). The power and communication wiring preferably extends through a channel in the top plate, through to the stator (and related sensors) and also through the central axis to support the next actuator (i.e., by means of the wire channel).

One primary issue in many applications of the actuators described herein is the performance-to-cost ratio. This ratio is preferably high in order to ensure wider utilization of the actuators. In a preferred embodiment, the actuator is a pancake actuator which is preferably supplied (from a responsive supply chain, as is now done with computer chips) in minimum sets for each application domain (size, power, torque density, quick-change interfaces, in-depth certification, cost level, durability, stiffness, etc.). An issue of cost may arise in the unique configuration of the principal bearing. Otherwise, very low-cost BLDC's, controllers, sensors, star gears, supporting bearings may be mass produced to create the best minimum set for each of a very large population of systems.

For example, in rehabilitation/assist for the disabled, it is desirable to create a modular/open architecture (mobile platforms, lifting arms, robot gurneys, orthotics, etc.) of systems that may rapidly be assembled to best meet an individual's physical needs in ADL (activities of daily living). The goal in all domains is typically to maximize performance while reducing cost, making assembly possible by the system manager with rapid repair by the system operator or immediately available service personnel. Thus far, this approach has not been pursued by U.S. producers of actuators. The field of computer chips provides a model to be used here: produce in large quantities in a given application domain to maximize performance while reducing cost, and still generating enough sales to support a thriving economic sector.

It is another goal of the present disclosure to design all components of a pancake actuator to hold a large vertical load while providing 10(+) ft.-lb. of torque to spin a drive wheel for a heavy transport platform, primarily within a smooth floor facility.

The pancake actuator described in the first part of this disclosure is intended for wide utilization and low cost applications. Scaling the actuator, once it is designed and tested with care, is straight forward. For example, given a design based on the use of specific materials, very low stress values, commonly available bearings, and the doubling of all dimensions may yield and actuator with eight times capacity of the referenced design. On the other end of the spectrum, the use of high quality materials, high levels of design stresses, and unique high load capacity bearings will typically raise the cost of the actuator, perhaps by as much as 5×. Doing so will substantially improve load capacity (e.g., torque density) where volume and weight go down by perhaps 5×.

The foregoing suggests that the actuator designs disclosed herein may warrant mass production at multiple scales (minimum sets for a given domain) and multiple levels of cost (as warranted by the domain). One of the low-cost domains is the present effort to create a spin actuator. By contrast, an important domain would be orthotics where torque density, volume, and back drivability are critical. The perspective here is to match performance/cost ratios as is now done for computer chips. Mass production lowers cost. This, in turn, enlarges consumers demand, thus enabling larger investments by industry—a lesson that is not prevalent in some procedures of electro-mechanical systems (such as, for example, those related to cars, trucks, trains, aircraft, orthotics, military platforms, and other such systems).

The third part of the present disclosure provides detailed drawings of a particular, non-limiting embodiment of a new low cost spin actuator prototype. Very low stresses (contact: 14,093 psi, bending: 9,097 psi) are typically use in standard spur gear design to enable low cost mass production. It is expected that very low cost production will occur for the large diameter (small cross-section) BLDC motor used in some embodiments described herein. This motor appears to scale to produce a 0.2 to 0.3 ft.-lb./lb., which is a very modest objective. One unresolved cost issue is the large diameter, small cross-section bearing which is difficult to find in standard bearing catalogs. Ultimately, the cost of repair must be reduced by mass production.

In a mass produced spin actuator, the pinion is a very important and heavily taxed component. Hence, special quality steel and production materials are recommended in its construction. Moreover, in some embodiments, the first mesh of the pinion and the large stars gears may be rather high in velocity, which may generate unwanted noise. Hence, in some embodiments, nylon or other such materials may be utilized in the first star gears to reduce or eliminate noise. It is noted, however, that nylon gear teeth deform much more than steel teeth, and hence it may be advisable to restrict their use to applications where their use is necessary.

The drawings herein are not intended to replace the practiced knowledge of a precision machine shop. For example, the exact shape of splines to drive pressed on gears may between bearing surfaces, shafts, and holes in the stationary frame structure may be based on shop experience. Further, the proper use of assembly bolts may also be given due consideration. Finally, the assembly sequence should preferably be discussed in detail so that the final prototype will be a valid test vehicle to recommend further development and production.

TABLE 1

Parts and Bearings List

| Part No. | Name | Description |
|---|---|---|
| 1 | Top Plate | Part of the main enclosing structure of the actuator, supports the main bolts that enclose the actuator. Its thickness and simple continuous shape provides structural integrity. Supports bearing that help to hold up the Rotor Plate and the Pinion. Provides placement and entrance for external wire. |
| 2 | Backbone Wall | Part of the main enclosing structure of the actuator, supports the main bolts that enclose the actuator. Its thickness around the outer race of the principal bearing allow the whole system to sustain large axial and radial loads. Holds stationary the outer race of the Principal Bearing. Holds outer race of bearings for amplification gears, and Pinion (second support for Pinion structure) |
| 3 | Stator | Part of the main enclosing structure of the actuator. Motor component. Adds rigidity around the actuator. Brings together the Top Plate and Backbone Wall |
| 4 | Rotor Inset and Rotor Plate | Part of the prime mover of the system, Rotor plate directly drives the Pinion Rotor plate has inner spline (with 10 teeth) to connect to Pinion Its supported via bearings through the Top Plate and via the Pinion through the Backbone Wall Thin laminates are used to keep hysteresis low |
| 5 | Large Star Gear | Total of 3 of these gears are used. They mesh directly with the Pinion. Each is part of an amplification gear system. Supported by bearings fitted in the Backbone Wall. |
| 6 | Pinion Gear | Only 1 is used. Starting point of the gear box. Connected and supported by prime mover via spline connection. Also supported by Backbone Wall via bearing. |
| 7 | Small Star Gear | Total of 3 being used. Part of the gear amplification system. They mesh with the Ring Gear. Supported by bearings that are held in place by the Backbone Wall |
| 8 | Ring Gear/ Output Plate | The Ring Gear is the last gear of the system, it makes up the output. It is held in place by the inner race of the Principal bearing Its thickness between bearing and the gears provides structural integrity to the output plate. The outward facing side of the output plate is used to connect other pieces (possibly via and acme thread and lock). Acme thread may be stiffer than regular threads, and will work in this application due to low number of turns. |
| 9 | Inner Bracket for Principal Bearing | Bolts directly to the Output plate to hold the inner races of the Principal Bearing. |
| 10 | Outer Bracket for Principal Bearing | Bolts directly to the Backbone Wall to hold the outer race of the Principal Bearing. |
| 11 | Stator Support Frame | Part of the main enclosing structure of the actuator, supports the main bolts that enclose the actuator. This piece is added above and below the Stator to let the Stator's Wiring Turns through and help to completely close up the actuator. |

TABLE 2

Bearings*

| Bearing No. | Description |
|---|---|
| A (a.k.a. Principal Bearing) | Roller Bearing.<br>Will need to support axial and radial load.<br>Loads come from the Backbone Wall and the Output Plate.<br>Current assumed dimensions:<br>    Bore: 3.95"<br>    Outside diameter: 4.75"<br>    Width: 0.4"<br>    If any of these dimensions change when selecting this bearing, one has to make sure that the critical dimensions of 0.4" and 0.427" are kept, or increased (this is shown in the FIG. below).<br>    When the bearing is finally selected, it's very likely that its dimensions will not match the assumed dimensions. Due to the new bearing dimensions, the parts that will need to be updated are:<br>        Backbone Wall<br>        Output Plate<br>        Inner and outer seal of the Principal Bearing |
| B | Press fit into Backbone Wall.<br>Non-spline end of rotating Pinion press fits into this bearing.<br>Can be a needle bearing (as there is virtually no axial load here) or roller bearing<br>Current assumed dimensions:<br>    Bore: 0.3"<br>    Width: 0.3" (or smaller)<br>    Outside diameter: 0.9"<br>        Or smaller, so it won't interfere with bearing D<br>If dimensions change when bearing is selected, parts that will need to be updated are:<br>    Pinion<br>    Backbone Wall |
| C | Press fit into Top Plate.<br>Rotor plate press fits into this bearing.<br>Holds rotating Rotor Plate in place via stationary Top Plate structure.<br>Can be needle bearing or roller bearing<br>    Roller bearing might be needed to support the small weight of the Rotor, Rotor Plate, and Pinion<br>Current assumed dimensions:<br>    Bore: 1" (may be larger)<br>    Width: 0.25" (or smaller if possible)<br>    Outer diameter: may vary as needed<br>If dimensions change when bearing is selected, parts that will need to be updated are:<br>    Top Plate<br>    Rotor plate |
| D | Press fit into Backbone Wall.<br>Small Star gear's non-splined part of shaft press fits into this bearing.<br>Holds rotating Large and Small Star gear in place via Backbone Wall<br>Can be a needle bearing (as there is virtually no axial load here) or roller bearing<br>Current assumed dimensions:<br>    Bore: 0.3"<br>    Width: 0.3" (or smaller)<br>    Outside diameter: 0.9"<br>        Or smaller so it won't interfere with bearing B<br>If dimensions change when bearing is selected, parts that will need to be updated are:<br>    Small Star Gear<br>    Backbone Wall |

*Dimensions mentioned in this table of bore, width, and outside radius refer to FIG. 1 below.

Some choices for bearings B, C, and D have been included herein. This selection is only of ball bearings; needle bearings or cylindrical bearings may also be considered for these bearings. Bearing B and D may be idsentical, due to the fact that they face the same constraints. The bearing choices given follow the instructions found in Table II above. The attached choices are excerpts of much larger catalogs that include guidelines in shaft sizing and tolerances.

Press fit tolerance for every bearing is preferably within the range of about $1/1000^{th}$ to about $2/1000^{th}$ of an inch.

Preferably, great care should be taken to minimize deviations from the principal bearing's critical parameters, since deviating from these values may cause a loss in structural integrity in the backbone wall and/or output plate (See Table II).

The current assumed dimensions for the principal bearing may result in difficulty in finding such a bearing in a typical catalog, due to its large diameter and small width. In particular, the trend that cataloged bearings follow is that as the diameter increases, so does the width of the bearing. When a bearing is finally selected, fillets may need to be added to the parts that hold the bearing in place.

The rotor plate and large star gears preferably have inner splines. The pinion and the small star gear preferably have outer splines. All of these preferably use the following spline parameters:
    10 teeth
    Tooth thickness: 0.05"
    Inner diameter: 0.27"
    Outer diameter: 0.30"
Since both the inner and outer splines, which will mate, have the same dimensions, it may be necessary to determine the optimal tolerance between the inner and outer spline.

In preferred embodiments of the actuators disclosed herein, the rotor and rotor plate are preferably allowed to need to rotate freely, without interference from the top plate, stator, backbone wall, or large star gears. For this reason, there is preferably a clearance of about 0.01" in every side of the rotor and rotor plate.

Preferably, the gears are also permitted to rotate without any interference. Therefore, in preferred embodiments, there is a 0.01" clearance above and below every gear. The output plate (which includes the output ring gear) also has a 0.01" clearance on each side from the backbone wall. The airgap between the stator and the rotor is preferably about 0.015". Of course, it will be appreciated that some applications may require more or less clearance.

In one particular, non-limiting embodiment, the main shell of the actuator, which consists of the top plate, stator, and backbone wall, is held in place by 20 bolts. These 20 bolts are equally spaced around the actuator, and do not interfere with the internal structures of the stator. The number, size, and placement of bolts may vary from one application or embodiment to another.

The number and placement of the bolts used to hold together the output plate and the backbone may vary from one application or embodiment to another. Some embodiments feature 20 such bolts in an equally spaced arrangement around the inner and outer bracket to hold the principal bearing in place.

Wiring for a component attached to the output plate preferably extends through the top plate and passes through the rotor plate, pinion, and output plate. Dimensions for this wiring passage may vary from one embodiment to another.

The rotor inset in some embodiments is about 0.7" wide and is preferably bolted into the rotor plate frame. The stator frame in such embodiments may be about 0.8" wide, with end turns about 1.25" wide. This may require grooves of about 0.15" in each neighboring plate (the top plate and the backbone wall). The grooves also provide clearance for the wiring of the stator. The exact shape of this assembly may be determined by the producer of the BLDC motor.

The following is a brief description of the design process for the pancake type spin actuator. This actuator seeks to meet the demands for a particular type of hospital bed, it being appreciated that the actuators disclosed herein may be utilized in a variety of uses.

A particular, non-limiting embodiment of an actuator disclosed herein utilizes a 1-stage star compound gear train, with its attendant ruggedness due to its top plate and backbone wall, and ruggedness and compactness due to its embedded motor. As show in FIG. 1, the purpose of this particular pancake actuator design is to rotate the drive wheel of a hospital bed. The bed in question preferably has the following approximate dimensions:

Length: 93.5"
Width: 32.5"
Height: 46"
Weight of bed: 1500 lbs.
Weight of bed and 500 lbs. patient: 2000 lbs.

In a typical application, four of these actuators will be used, one at each corner of the bed. This means that each actuator will have an axial thrust load of 500 lbs. (when patient is in bed). The spinning torque demand of the actuator has been estimated to be 10 ft.-lbs.

As mentioned above, this spin actuator preferably uses a 1-stage star compound gear train. All of the calculations below are for this specific gear train; if more stages are added, some gear train calculations may change. The Bandaru/Tesar Report was used as the main source for equations to design the gear train.

The Bandaru/Tesar Report maps out the geometric calculations for the 1-Stage star compound gear train (p. 48-60). These equations are specified for gears with an involute tooth profile. For sake of succinctness, the equations and diagrams used by Bandaru/Tesar are not included in this document.

From pages 48 to 60 in the report, the critical geometric values that come out for each gear are teeth count and pitch diameter. The mesh parameters calculated in this section include the gear reduction ratio, amplification factor, gear mesh diameter, diametral pitch, and gear face width.

Other geometric values for the gears that may be needed to manufacture them may be found in page 17 and 19 of the Bandaru/Tesar Report. These parameters include the addendum, dedendum, whole depth, working depth, clearance, tooth thickness, base circle diameter (Carter) ("Gear Nomenclature"), and addendum correction and backlash (AGMA Information Sheet). All of these values, along with working drawings of the gears, may be found in Part 3. Some values that are not shown in the working drawings but are mentioned above are tabulated in TABLE 3 below.

TABLE 3

Gear Train Parameters Not Found in Working Drawings

| Parameter | Value |
|---|---|
| 1$^{st}$ Mesh Reduction Ratio | 4 |
| Pinion and Large Star Gear Meshing | |
| 2$^{nd}$ Mesh Reduction Ratio | 4 |
| Small Star and Internal Gear Meshing | |
| Amplification Factor | 2.4 |
| Large Star Pitch Diameter | |
| Small Star Pitch Diameter | |
| Gear Mesh Diameter | 3.667. |

Figure 24:
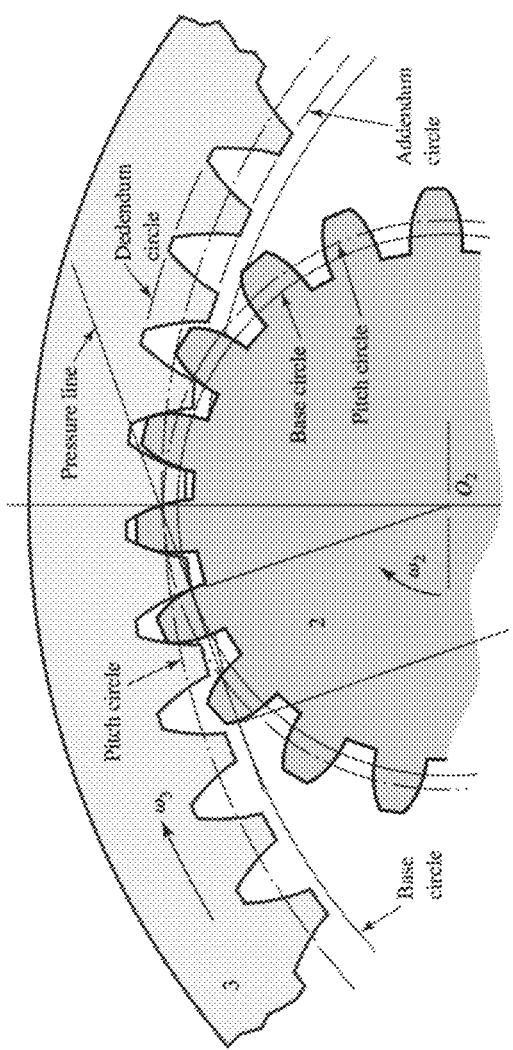
FIG. 24 is an illustration of internal gear meshing parameters.
Figure 25:
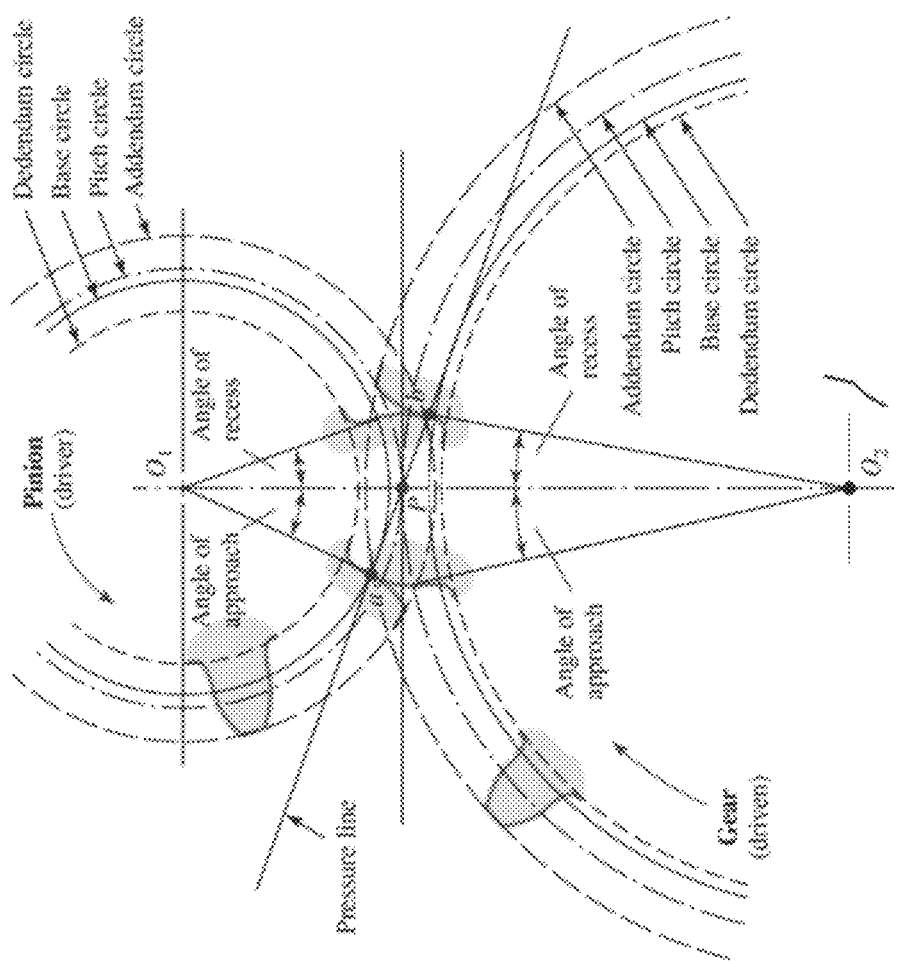
FIG. 25 is an illustration of gear meshing parameters.
Figure 26:
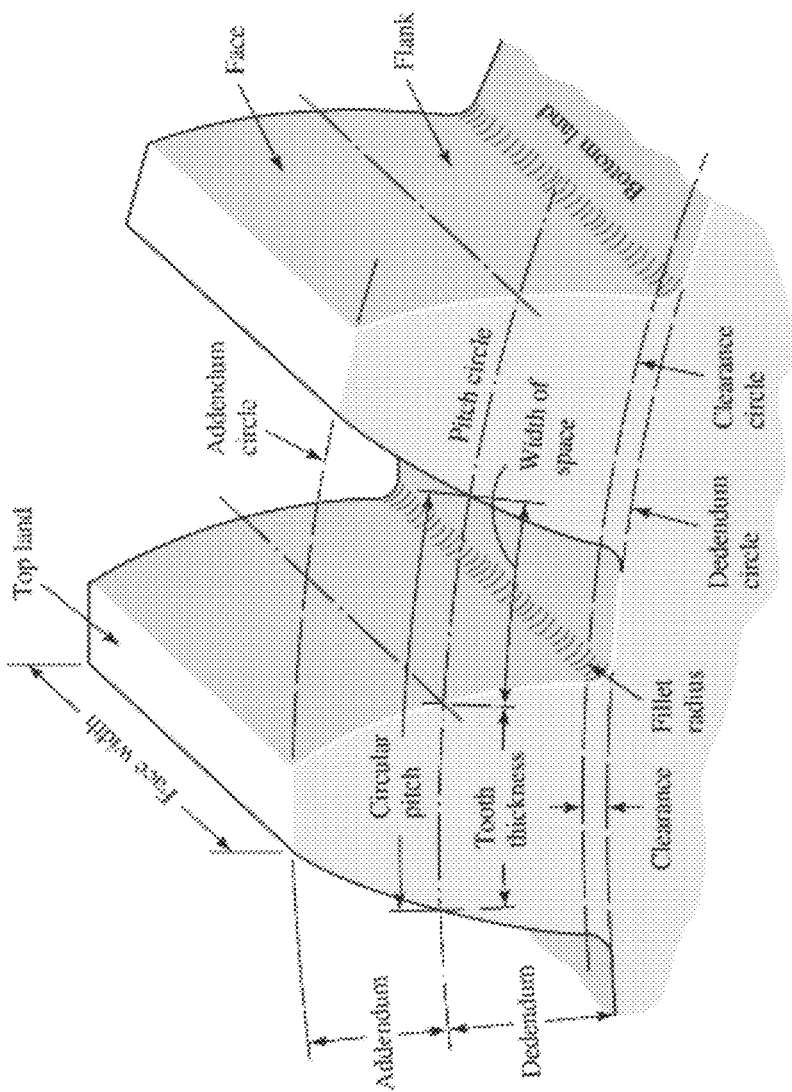
FIG. 26 is an illustration of detailed gear parameters.

These values may be further understood with reference to FIGS. 24, 25 and 26. All of the gears have the same pressure angle of 25 degrees. Various sources show that this is the best common pressure angle for the design requirements because it avoids tooth interference. Budynas (p. 678) shows this by deriving an equation that sets the limit of teeth in the smaller gear of two meshing gears given a reduction ratio and pressure angle. The equation is as follows:

$$N = \frac{2k}{(1+2m)\sin^2\theta}\left(m + \sqrt{m^2 + (1+2m)\sin^2\theta}\right) \quad \text{Equation 1}$$

Where:
N: Number of teeth in the smaller gear in mesh
K: Tooth depth constant
1 for full-depth teeth, which is what is used here
0.8 for stub teeth (not used in this project)
θ: Pressure angle $$m: \text{reduction ration} = \frac{N_{Gear}}{N_P}$$

With this equation, to reach the desired 12 teeth in the Pinion Gear, a pressure angle of 25 is needed. At the other common pressure angle of 20 degrees, 12 teeth in the Pinion could not be reached (even at a low reduction ratio of 2, the minimum number of teeth comes out to be 15).

The Bandaru/Tesar Repoprt (p. 21) also shows that at a 25 degree pressure angle, the minimum number of teeth is 12, by using the following equation:

$$N_{minimum} = \frac{2}{\sin^2\theta} \quad \text{Equation 2}$$

where:
$N_{minimum}$: Minimum number of teeth allowed
θ: Pressure angle

Another advisable interference check is done so that the three large star gears do not intersect with each other. The derivation, equation and diagram for this are found in pages 53 to 55 in the Bandaru/Tesar Report. To use this interference check equation, it should be noted that the addendum diameter is simply calculated by:

Addendum Diameter: $D° = (2*\text{Addendum}) + \text{Pitch Diameter}$   Equation 3

Figure 2:
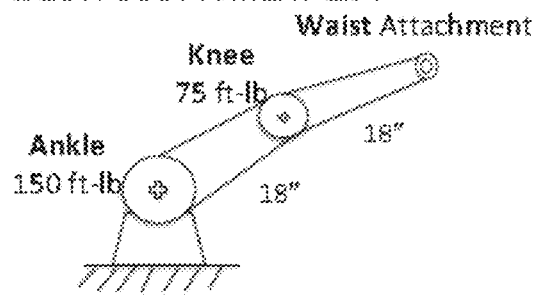
FIG. 2 is an illustration of a low-cost pancake actuator.
Figure 3:
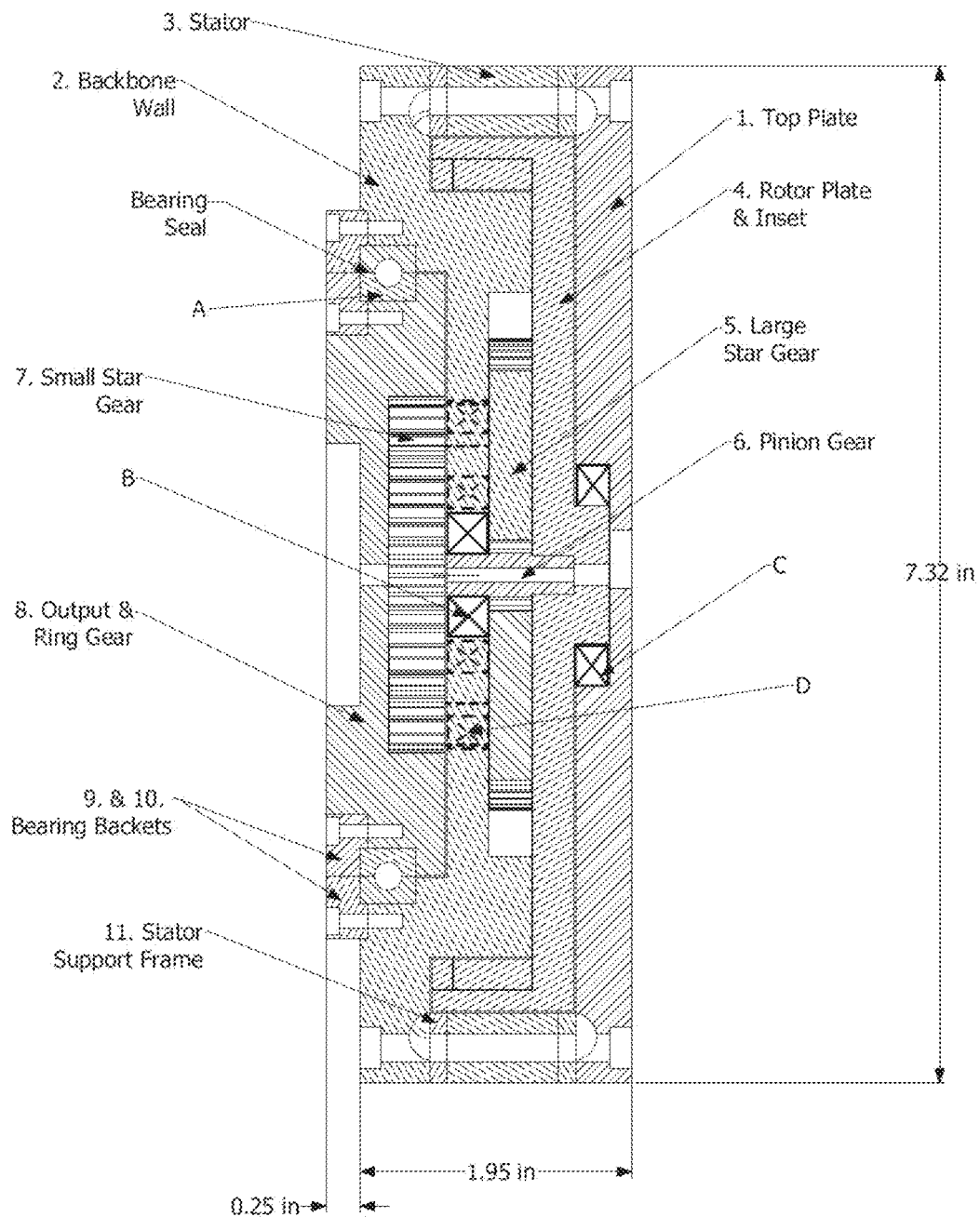
FIG. 3 is a cross-sectional illustration of a spin actuator in accordance with the teachings herein.
Figure 4:
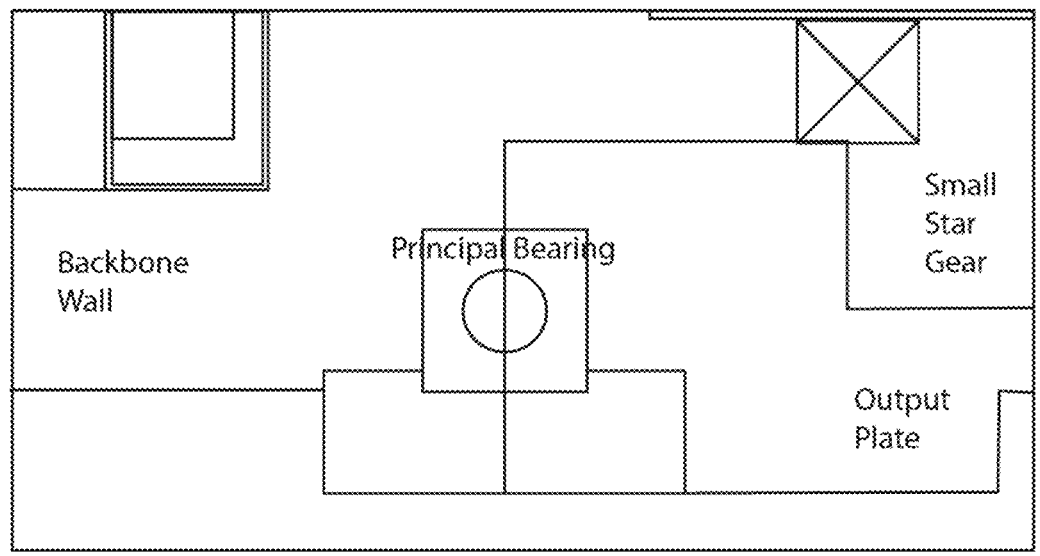
FIG. 4 is an illustration depicting preferred dimensions for the portion of an actuator near the principal bearing.
Figure 5:
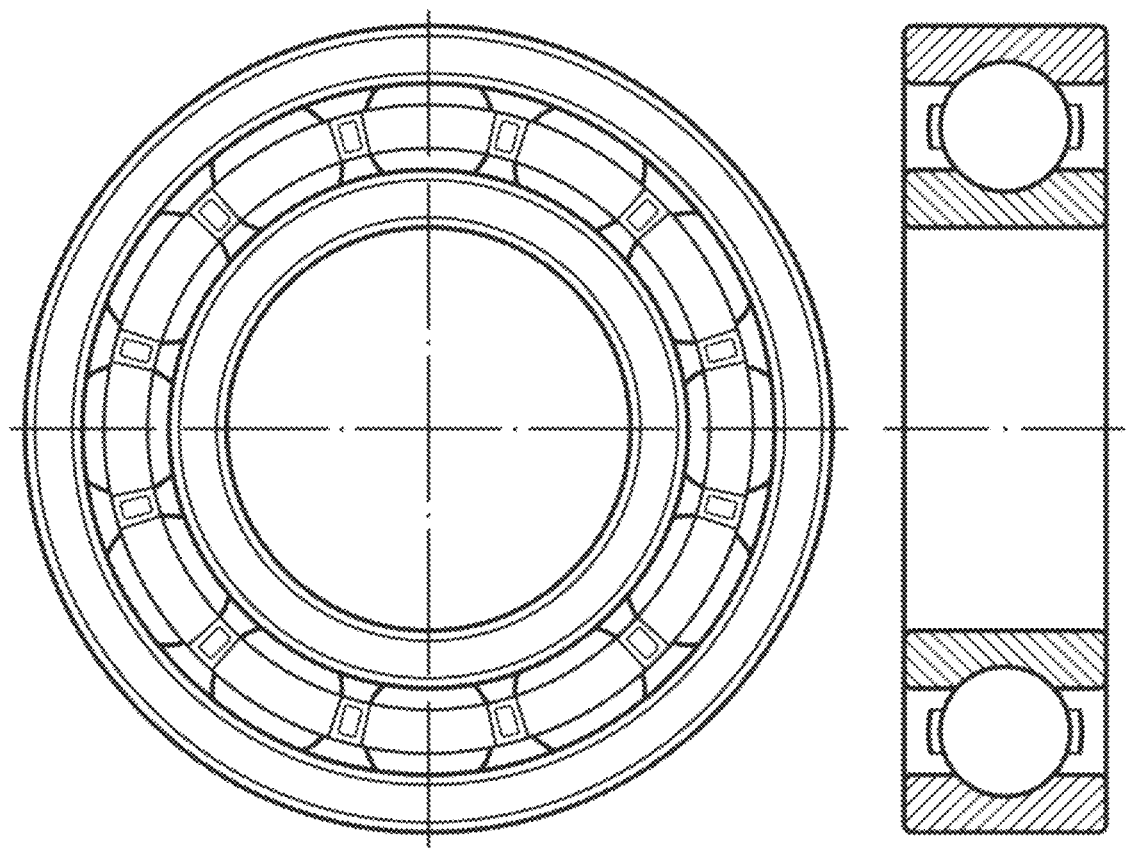
FIG. 5 is an illustration of a ball bearing assembly including a plurality of balls, cages, an inner race and an outer race.
Figure 6:
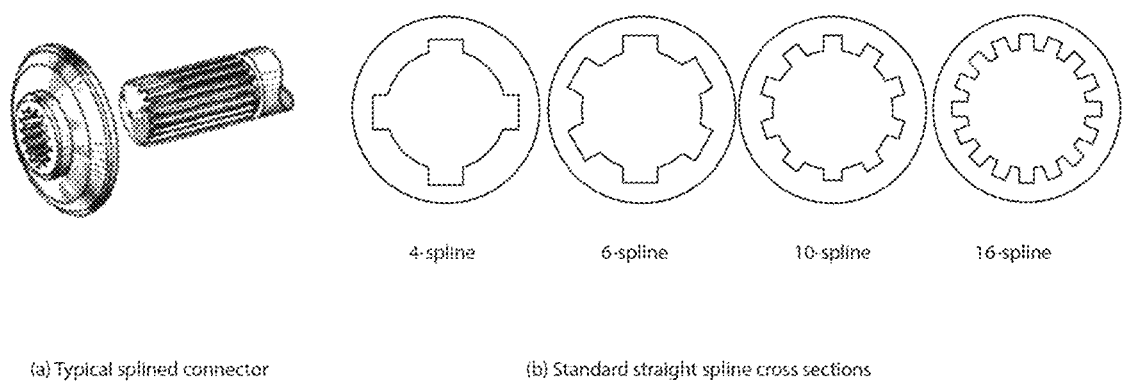
FIG. 6 is a schematic illustration of a spline connector.
Figure 7:
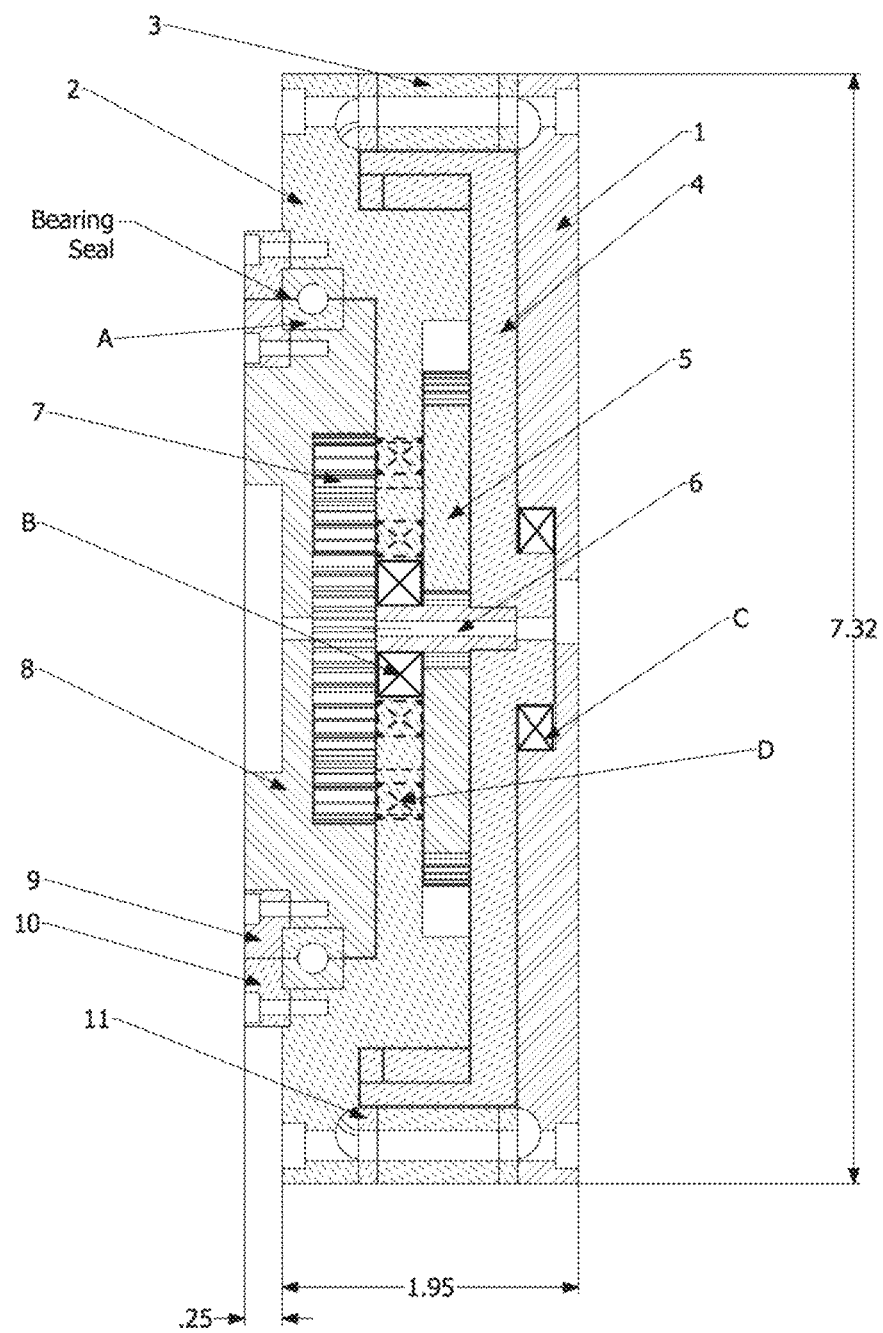
FIG. 7 is an illustration of an actuator in accordance with the teachings herein.
Figure 8:
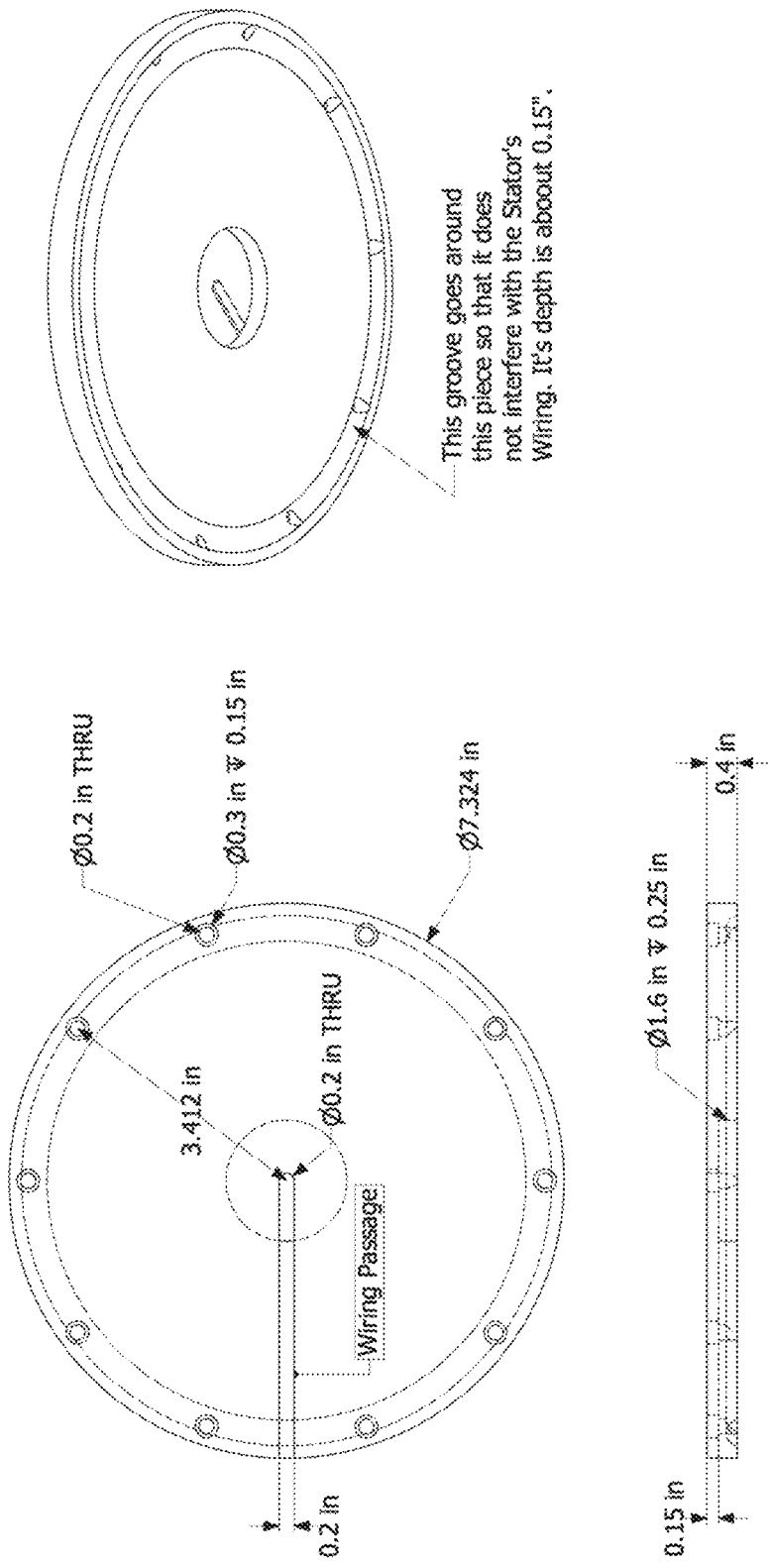
FIG. 8 is an illustration of a top plate of the actuator of FIG. 7.
Figure 9:
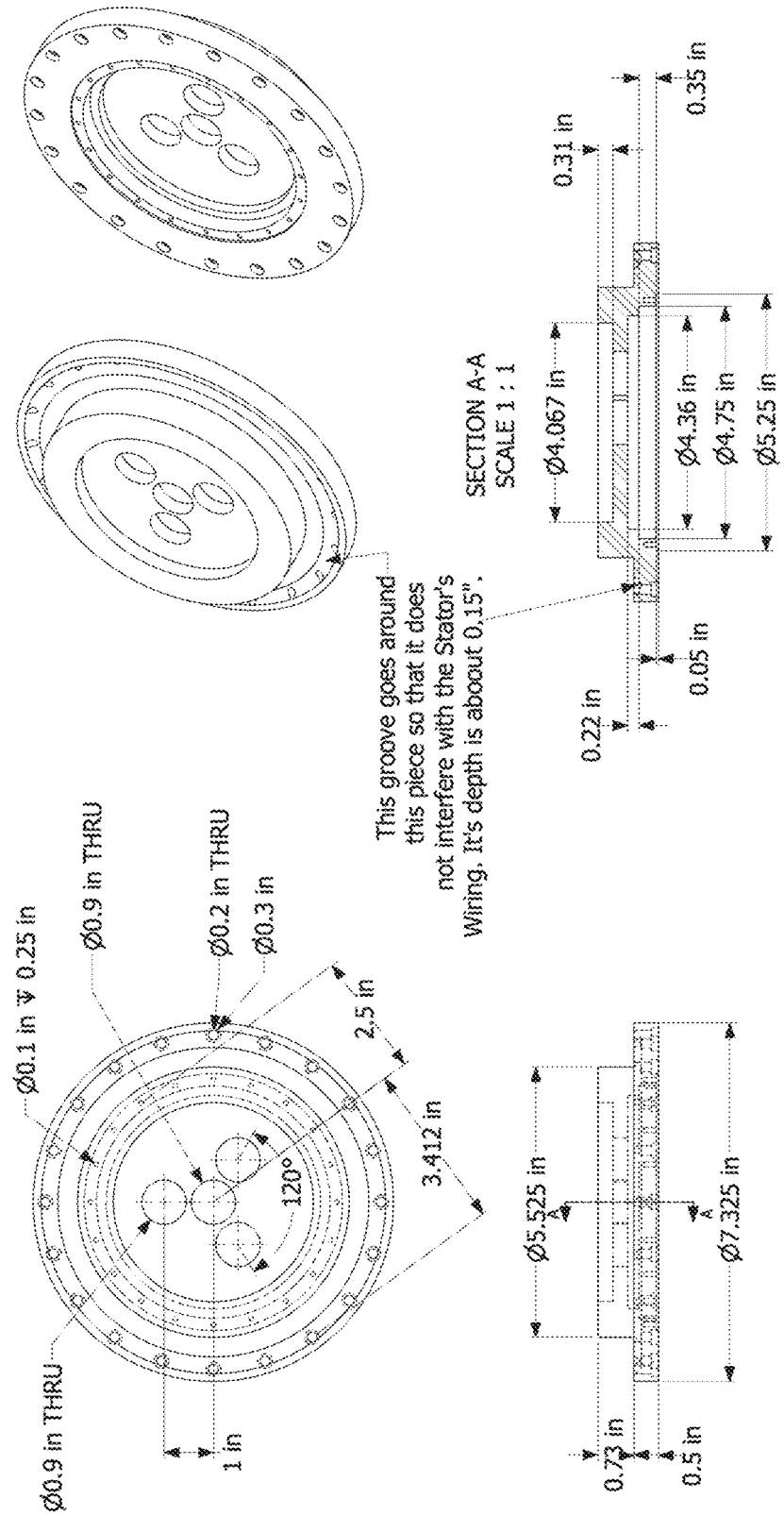
FIG. 9 is an illustration of a backbone wall of the actuator of FIG. 7.
Figure 10:
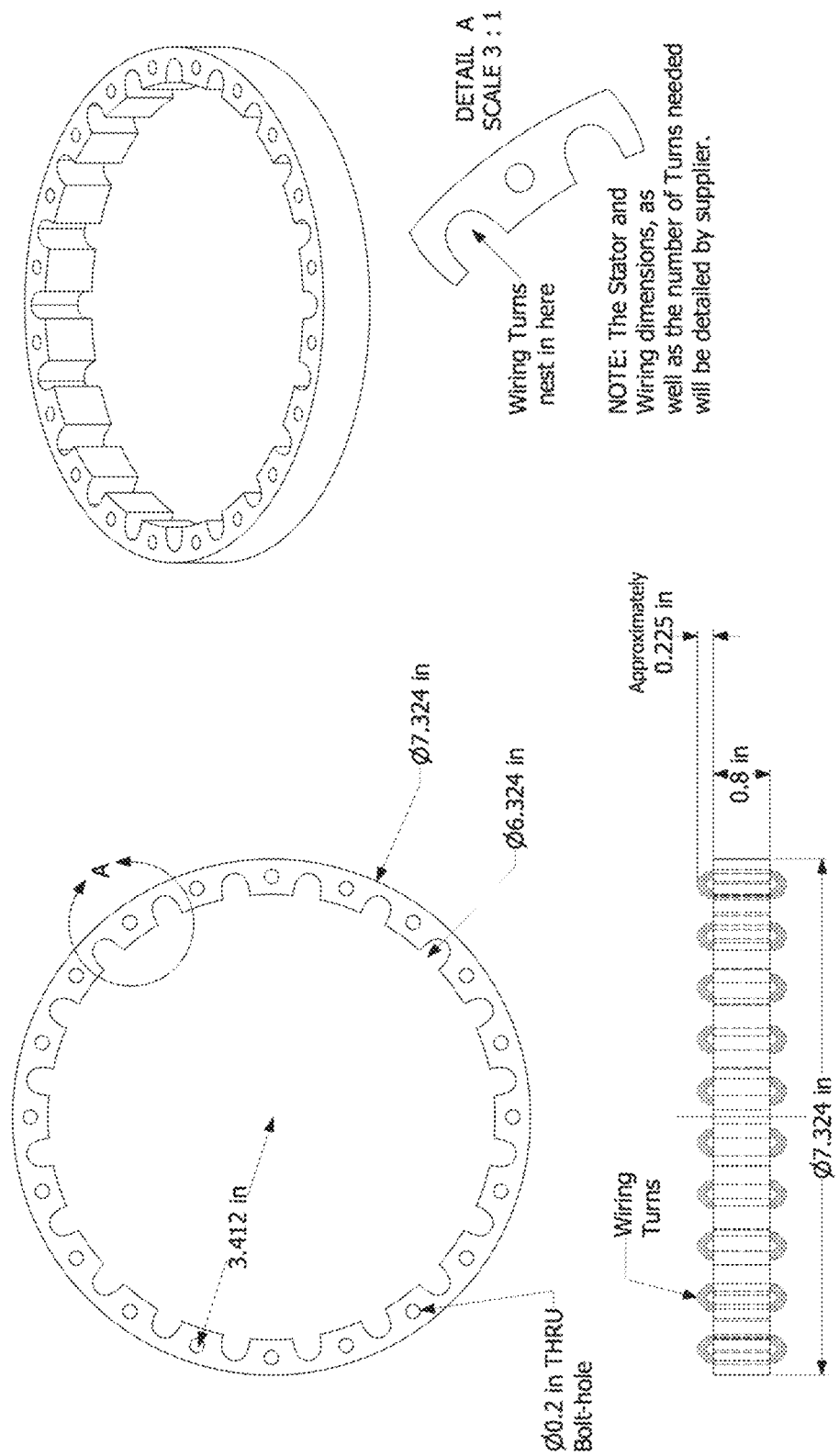
FIG. 10 is an illustration of a stator (with wiring turns showing) of the actuator of FIG. 7.
Figure 11:
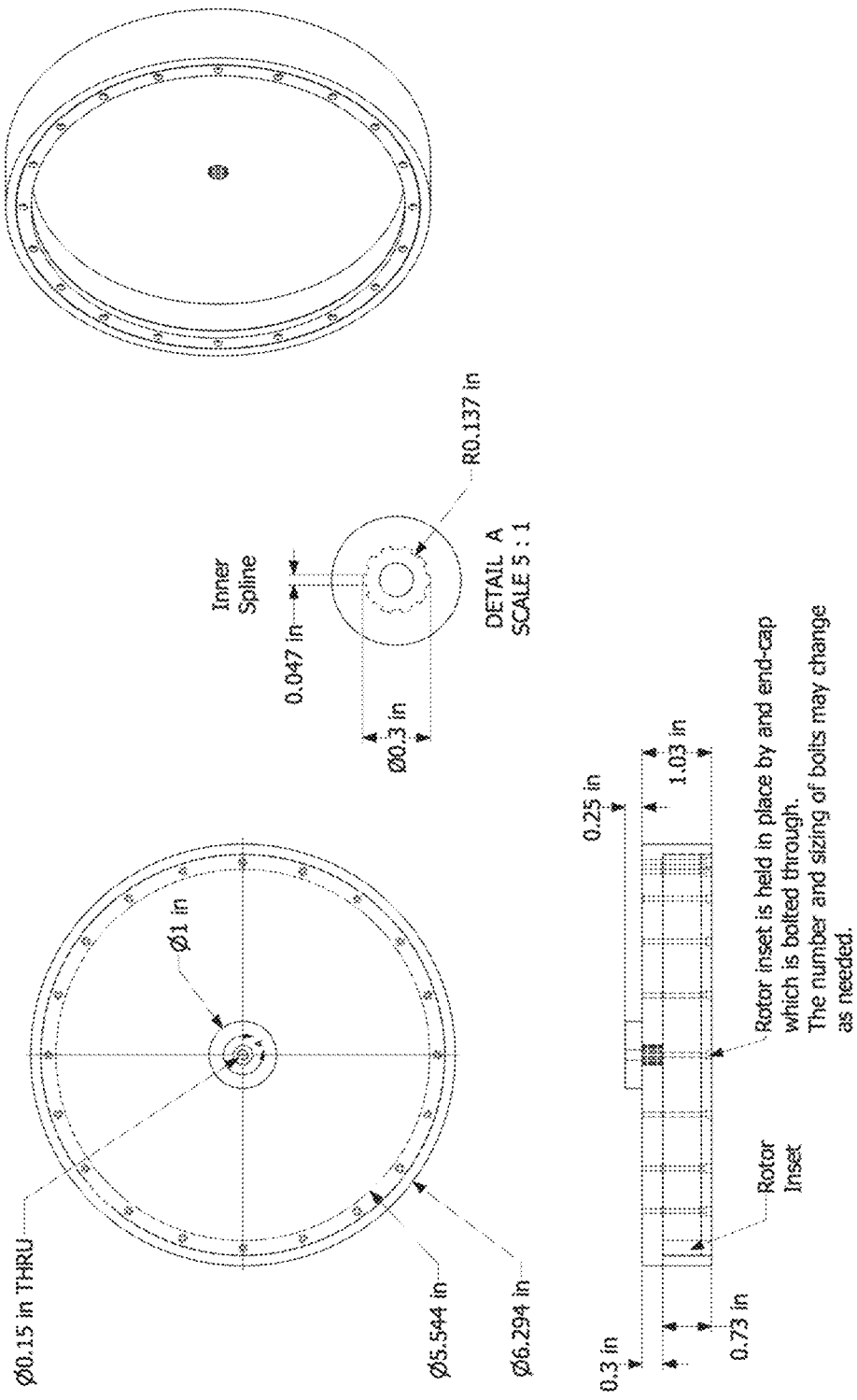
FIG. 11 is an illustration of a rotor inset and rotor plate of the actuator of FIG. 7.
Figure 12:
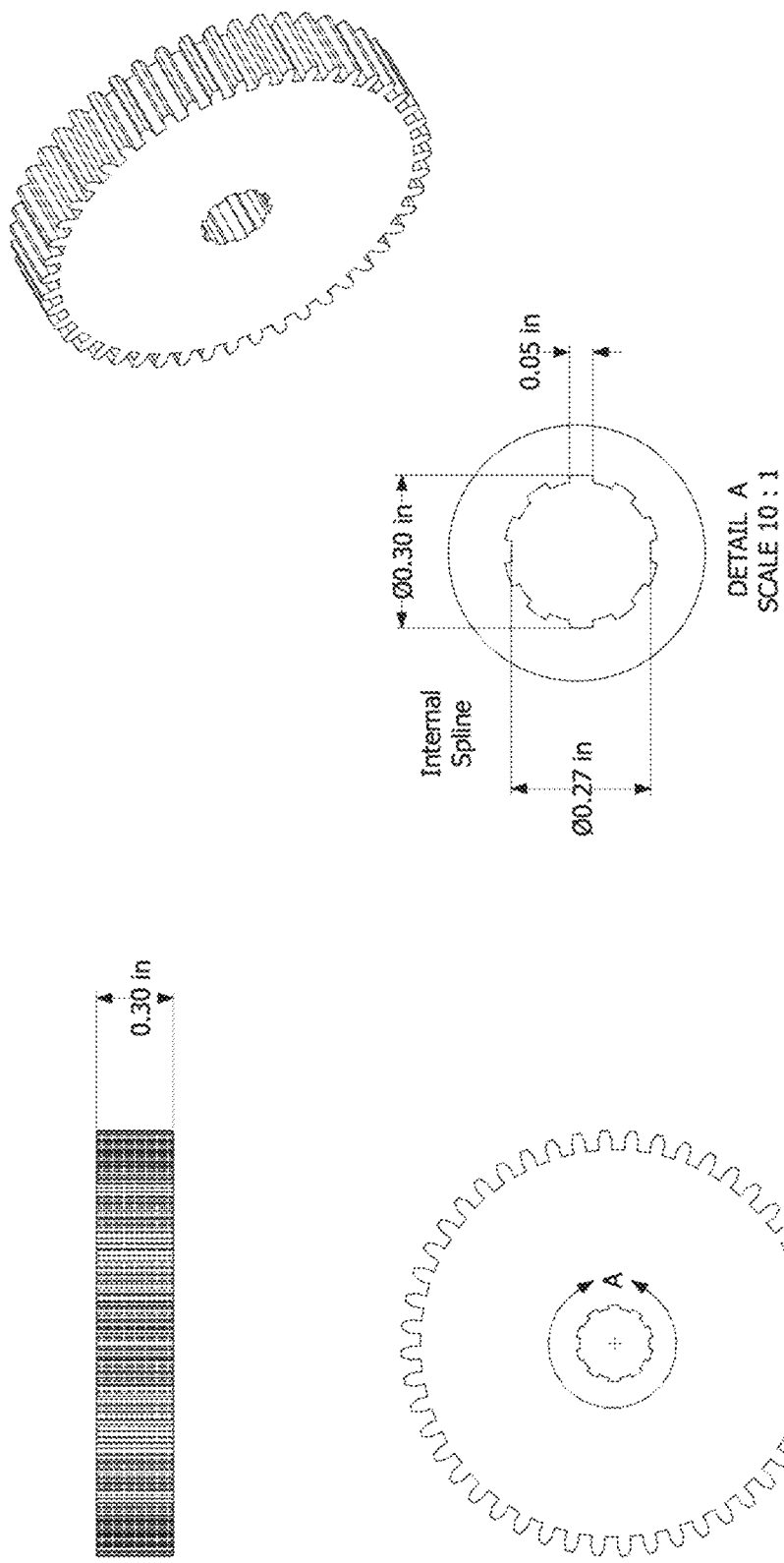
FIG. 12 is an illustration of a large star gear with an internal spline of the actuator of FIG. 7.
Figure 13:
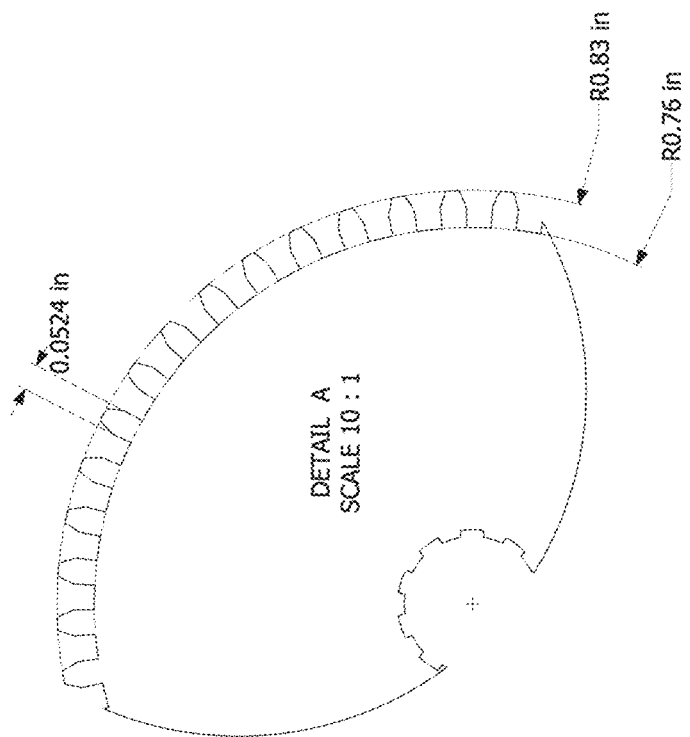
FIG. 13 is an illustration of the star gear of FIG. 12, showing detailed measurements thereof.
Figure 13:
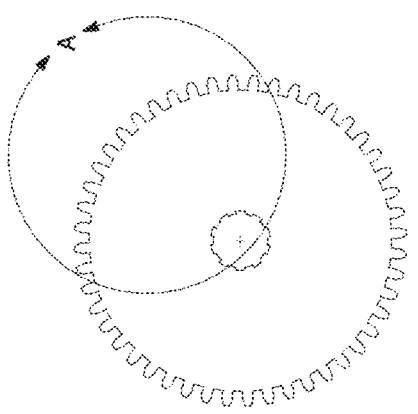
Figure 14:
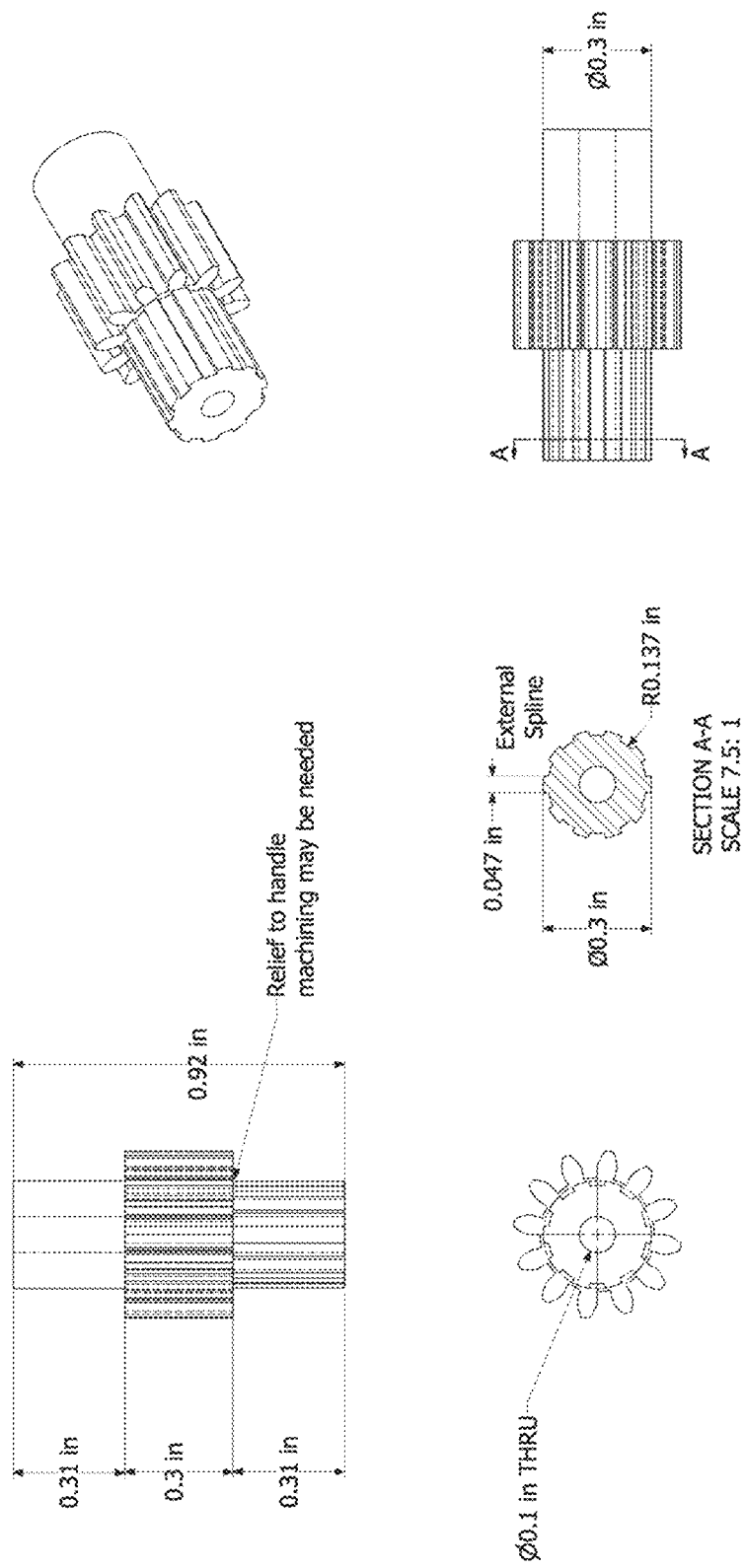
FIG. 14 is an illustration of a pinion gear with a splined shaft and a shaft for a bearing.
Figure 15:
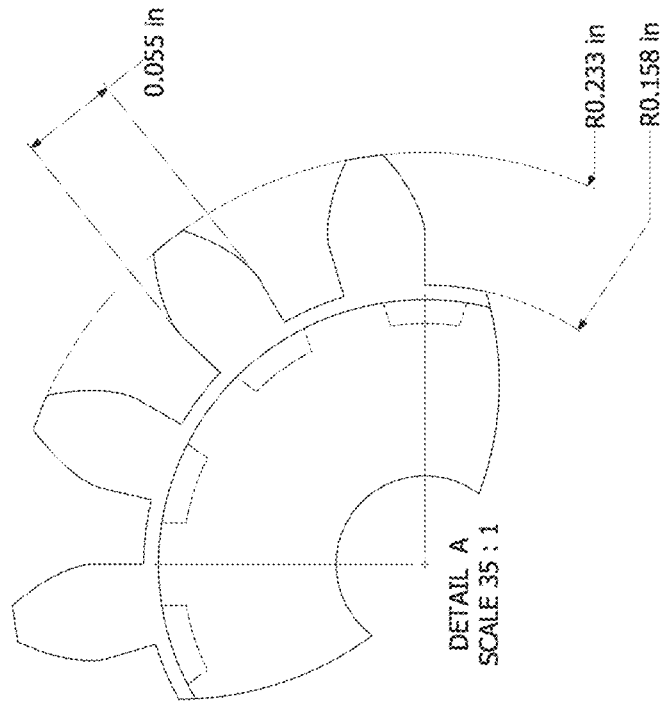
FIG. 15 is an illustration of a pinion gear with detailed involute profile measurements.
Figure 15:
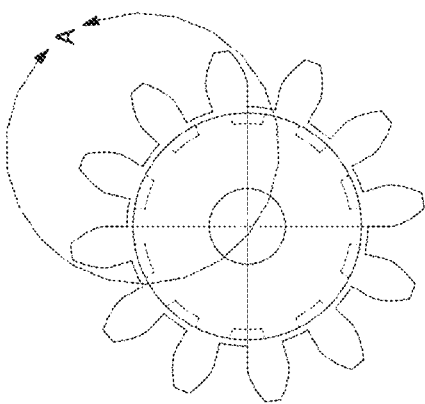
Figure 16:
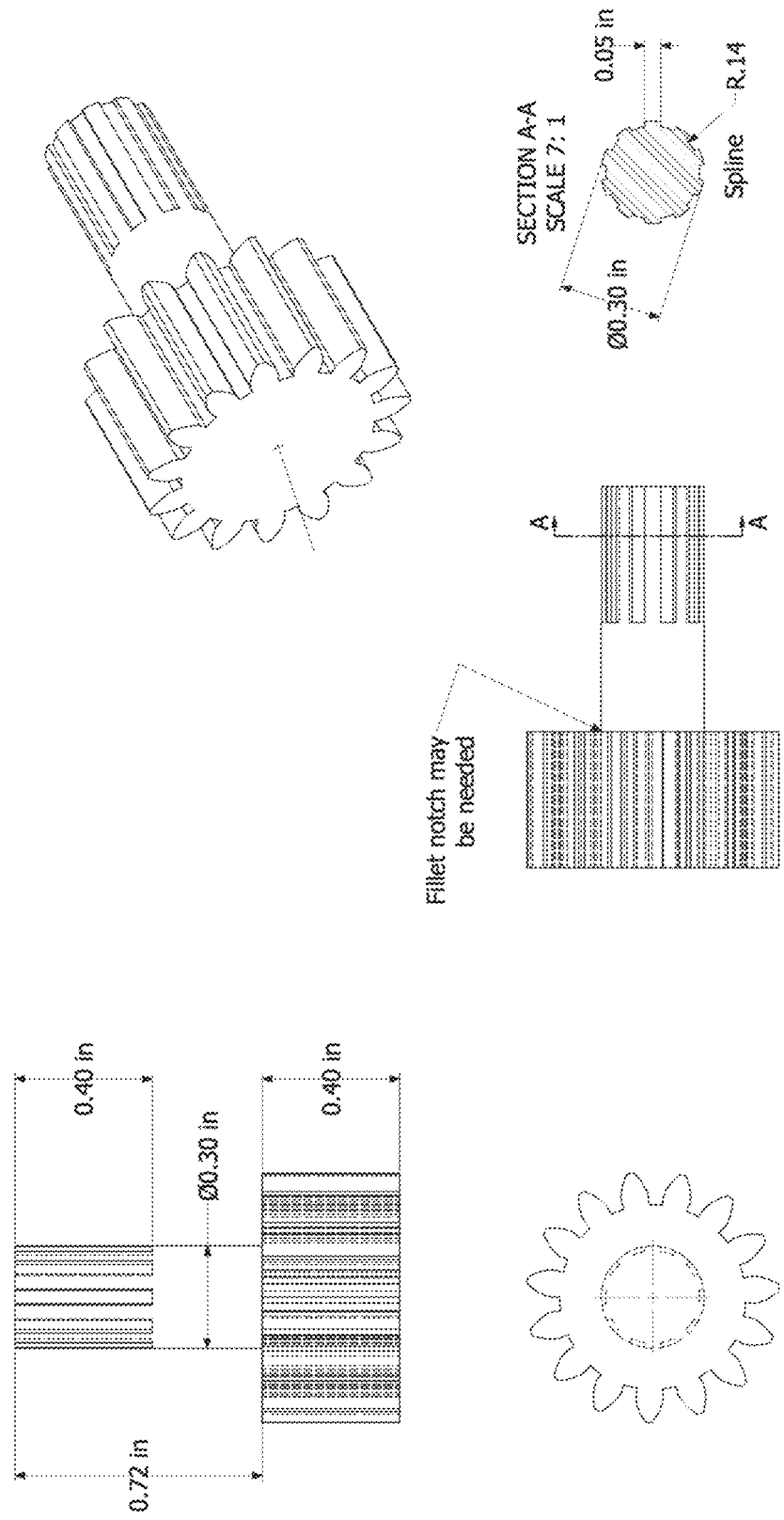
FIG. 16 is an illustration of a small star gear with a splined shaft.
Figure 17:
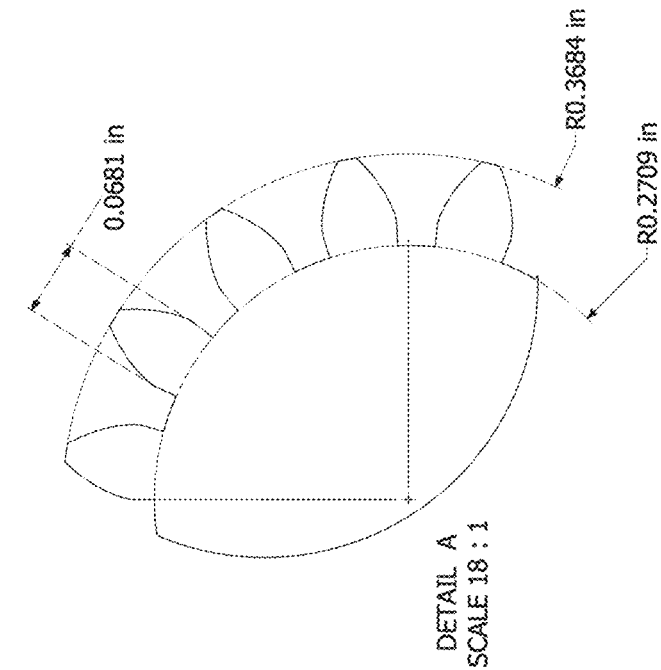
FIG. 17 is an illustration of a small star gear with detailed involute profile measurements.
Figure 17:
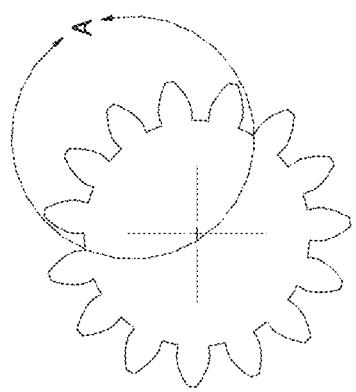
Figure 18:
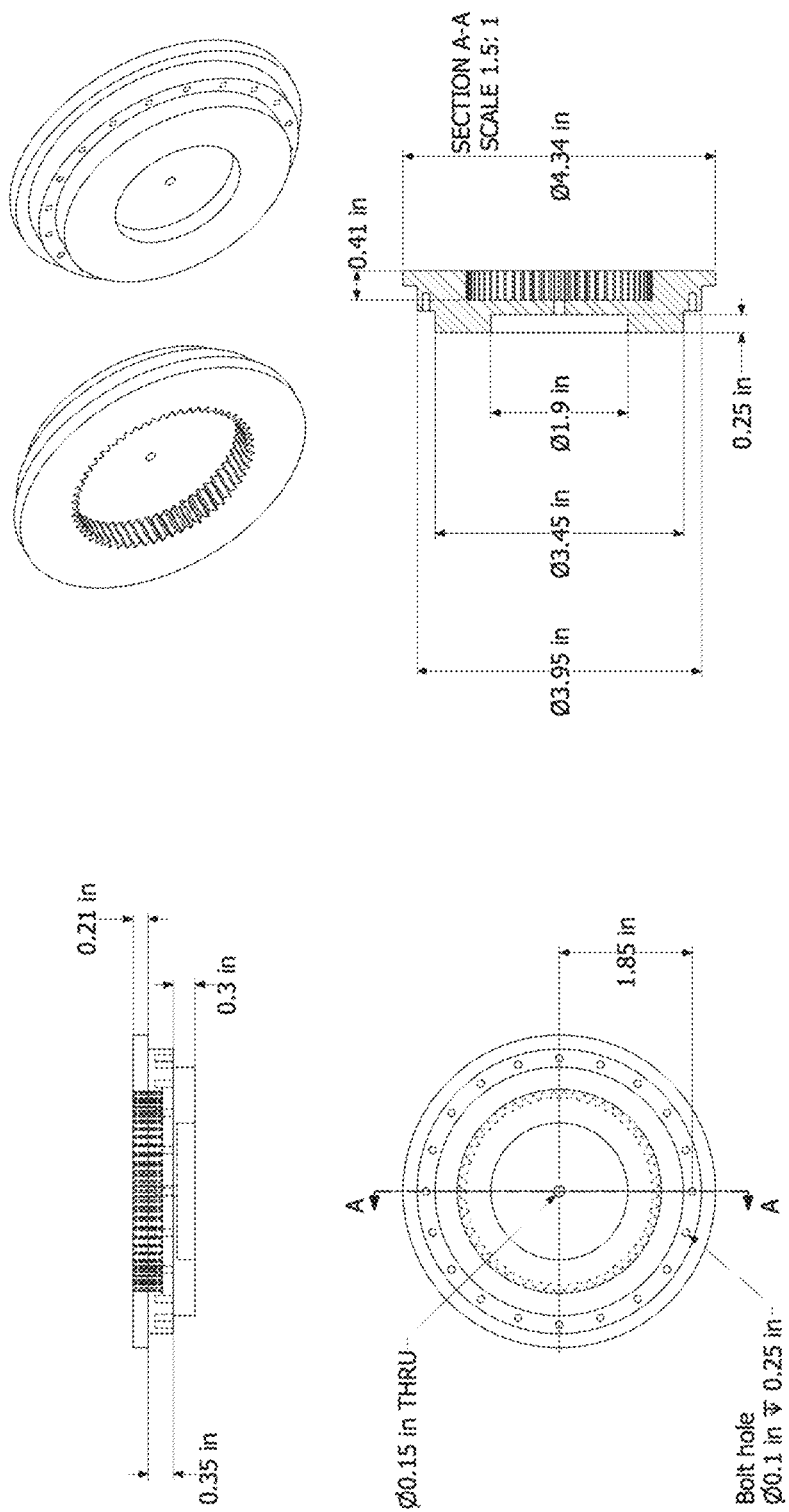
FIG. 18 is an illustration of an internal ring gear with an output plate.
Figure 19:
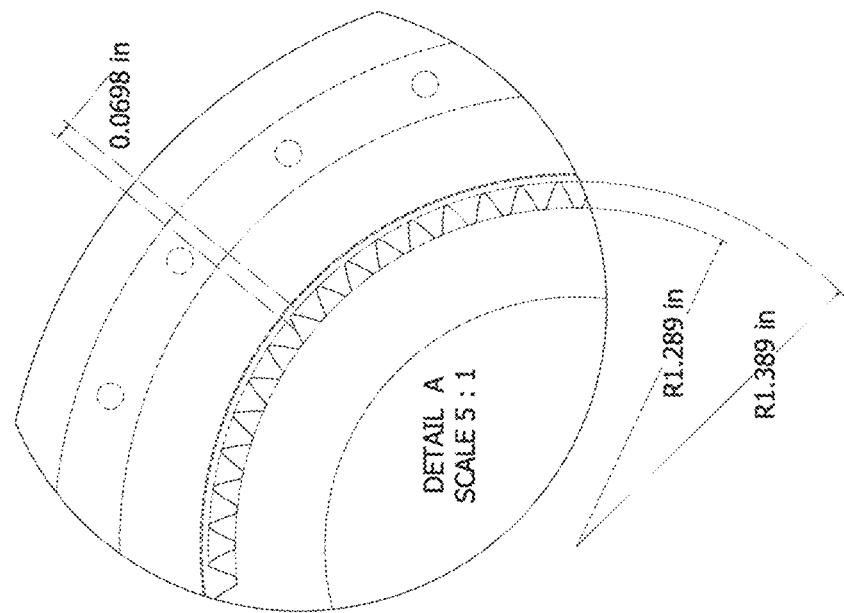
FIG. 19 is an illustration of an internal ring gear with detailed involute profile measurements.
Figure 19:
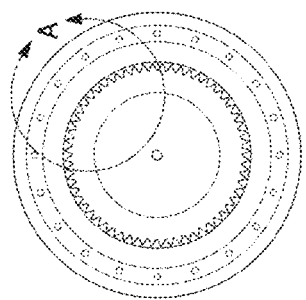
Figure 20:
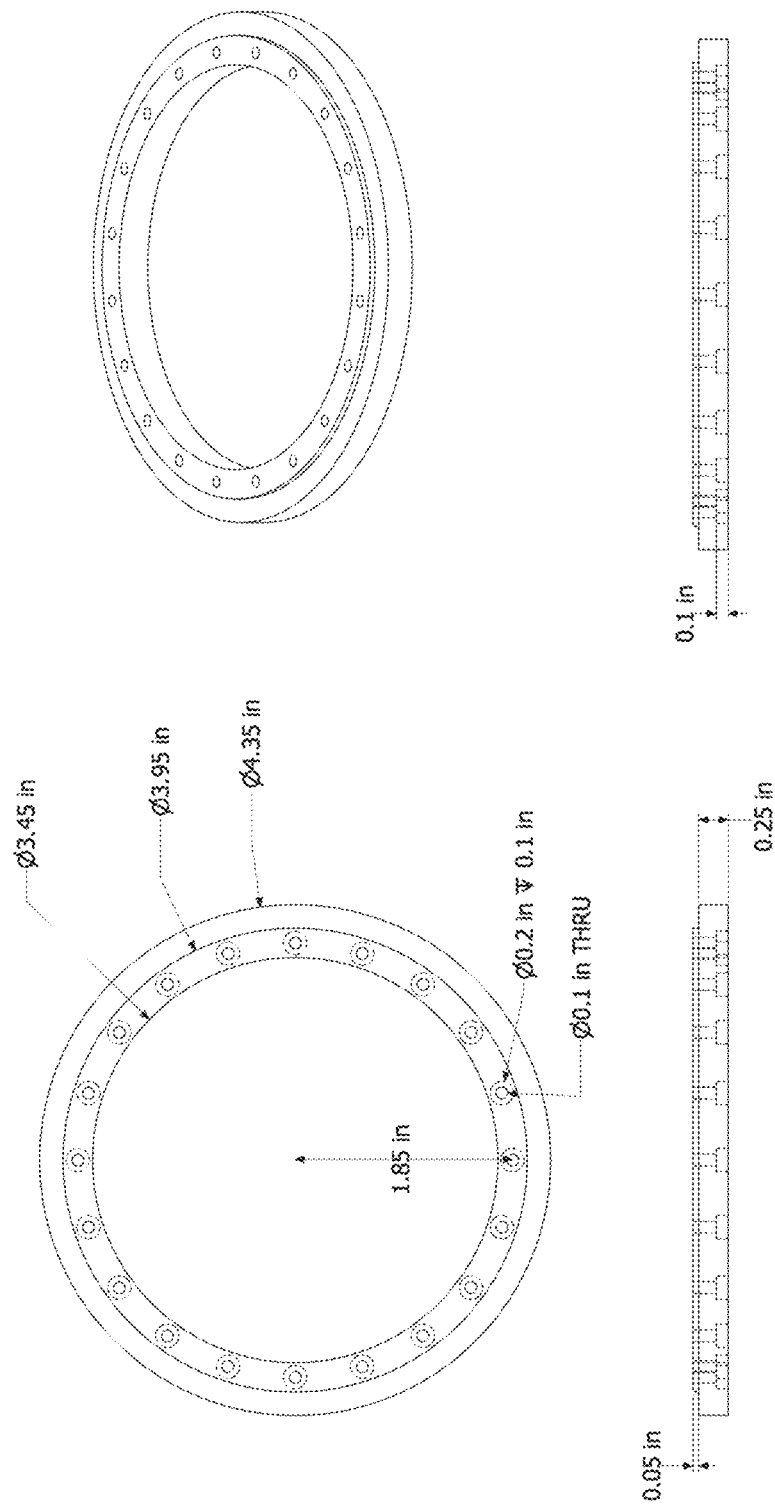
FIG. 20 is an illustration of an inner bracket for a principal bearing.
Figure 21:
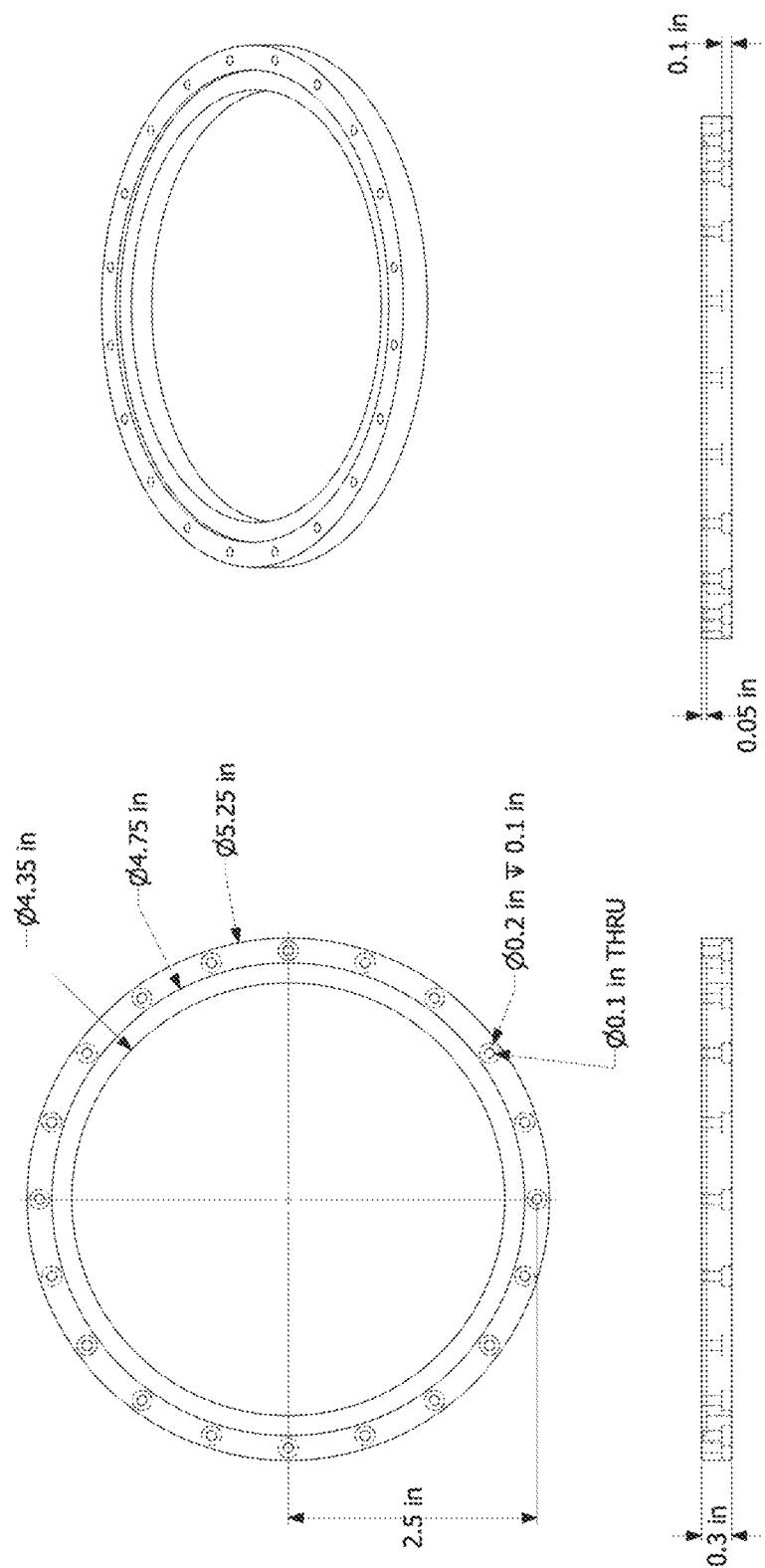
FIG. 21 is an illustration of an outer bracket for a principal bearing.
Figure 22:
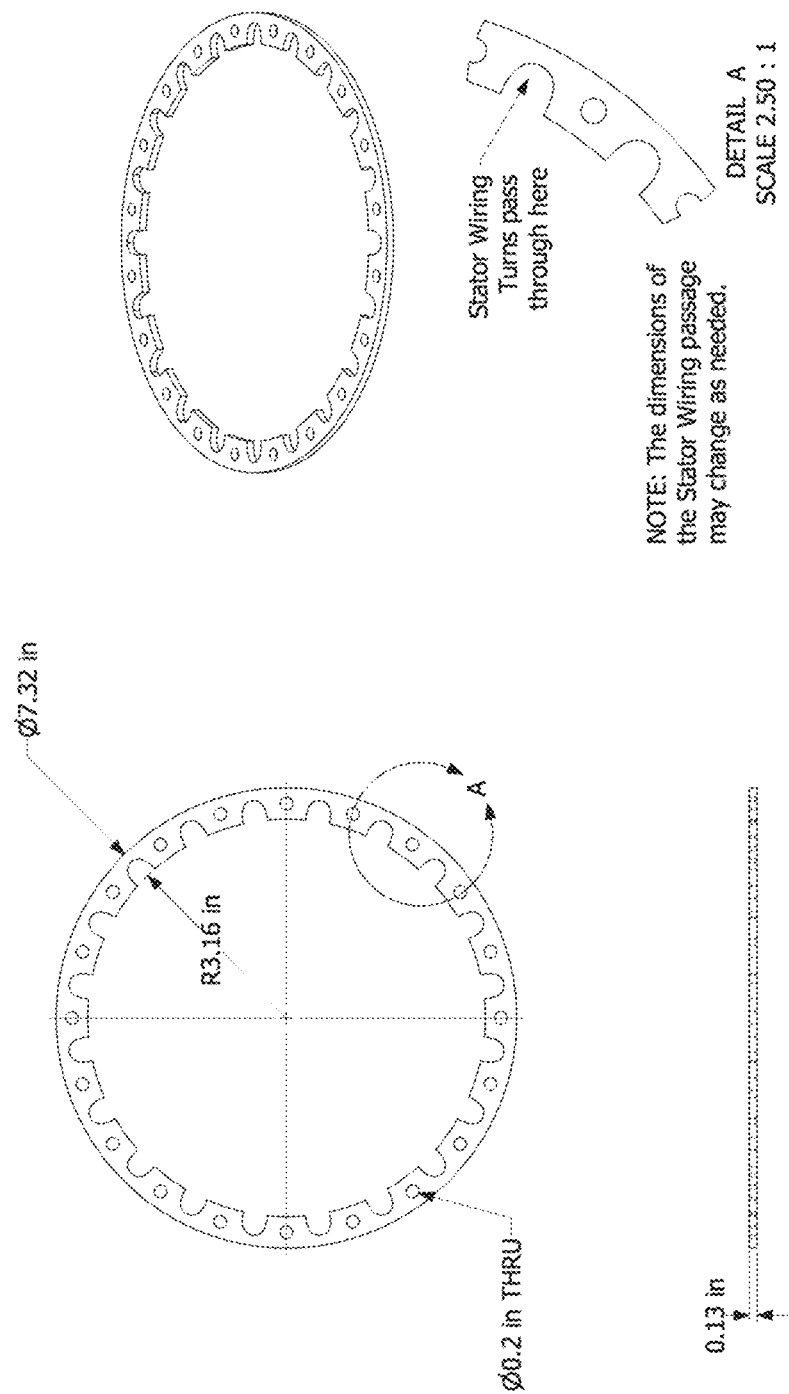
FIG. 22 is an illustration of a stator support frame.
Figure 23:
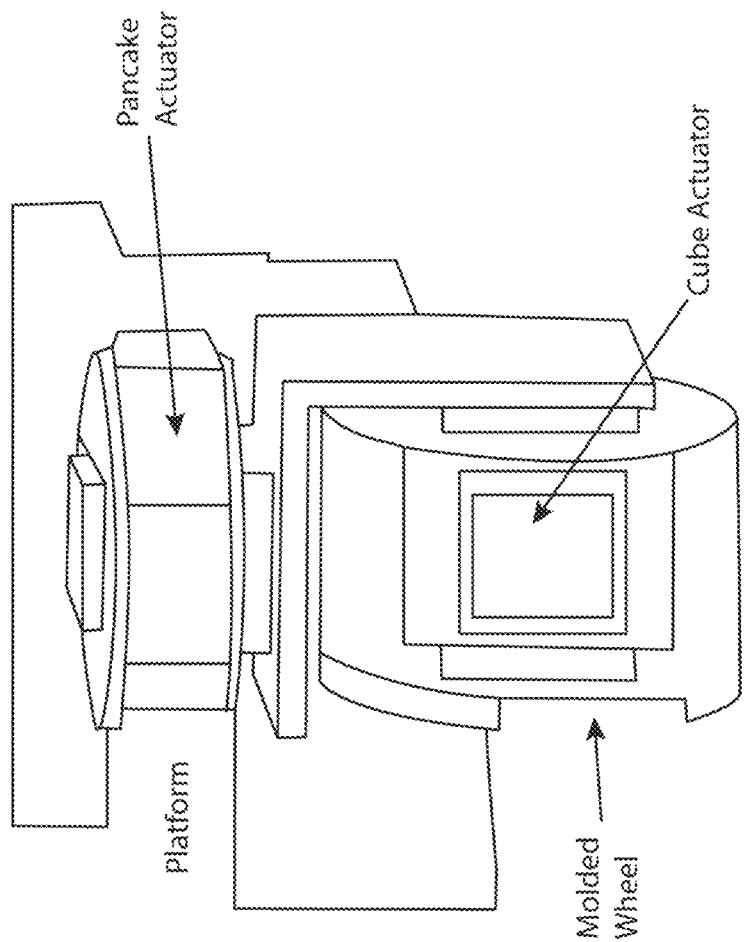
FIG. 23 is an illustration of a drive wheel system featuring a pancake actuator and a cube actuator.

EQUATIONS 1, 2, and 3 help avoid interference. However, a 25 degree pressure angle has its benefits and tradeoffs. The larger pressure angle of 25 degrees (when compared to the other common pressure angle of 20 degrees) results in smaller base circle and less number of teeth needed to form the involute profile. This is advantageous for the small pinion gear proposed for this prototype. One tradeoff made, however, is that with a greater pressure angle, frictional forces and bearing loads are increased, while the contact ratio is decreased (see Budynas, p. 679). The 25 degree pressure angle gear also has a thicker base and larger radius of curvature at its pitch line (see FIG. 2), allowing it to carry a higher bending-load, but generating more audible noise due to its smaller contact ratio (Collins 612).

The Bandaru/Tesar Report presents a few ways to calculate the face widths of each mesh in a gear train. They derive one way to do so by calculating for when "the actual stress becomes equal to the allowed stress" (p. 59). This is not necessarily true for this prototype that has a low torque demand.

With guidance from Dr. D. Tesar, a face width of 0.3 inches for the $1^{st}$ Mesh, and a face width of 0.4 inches for the $2^{nd}$ Mesh was considered. The two main reasons behind this suggestion were: to keep the width of the actuator around 2 inches, and that these values should be good enough to transfer the load. Because more load is transferred in the $2^{nd}$ Mesh than in the $1^{st}$ Mesh (see Table 6 below), the face width of the $1^{st}$ Mesh is smaller than that of the $2^{nd}$ Mesh.

To examine this suggestion, another method for calculating face width was used. The equation for this method is found in page 39 of Bandaru/Tesar:

$$9 \leq FP_d \leq 16 \qquad \text{Equation 4}$$

This limiting relationship states that the face width (F) multiplied by the diametral pitch ($P_d$) of a gear should be between 9 and 16. Bandaru/Tesar cites this relationship from two sources, and states that this is recommended in "most literature" (p. 39).

Section 3, the working drawings, shows the diametral pitch for each gear mesh. With these and Equation 4 above, the 0.3" and 0.4" face widths are justified:

TABLE 4

Justification for Face Widths

| Gear Mesh | Diametral Pitch (1/in.) | Proposed Face Width (in.) | Limiting Relation Check |
|---|---|---|---|
| $1^{st}$ | 30 | 0.3" | $FP_d = 0.3 * 30 = 9$ |
| $2^{nd}$ | 22.5 | 0.4" | $FP_d = 0.4 * 22.5 = 9$ |

For both gear meshes the limiting relationship equals 9, which is in the lower limit of the relationship, but still carries confidence by the fact that it is inside the limits.

In the Bandaru/Tesar Report, the gear material is one of the first properties selected. The design of this prototype deviates from this. For this prototype, great care is given initially to the geometry of the gear train and actuator as a whole, and then using equations from the report and the 10 ft.-lbs. requirement, the needed allowable stresses are found. With these allowable stresses one can select the gears material. Table 3 shows the result of this.

TABLE 5

Calculated Allowable Stress Levels for Prototype Gears

| Allowable Bending Stress (Sat) psi | Allowable Pitting Stress (Sac) psi |
|---|---|
| 10,607 (73 MPa) | 14,093 (97 MPa) |

For comparison, Table 4 below shows values of commonly used steel gears. These values were found in Budynas' (p. 741, p. 743) and Collins' (p. 634, p. 642), they are ordered by AGMA Grade value; the higher the Grade, the higher the expected monetary cost is.

TABLE 6

Common Steel Gears Allowable Stresses

| AGMA Grade | Heat Treatment | Allowable Bending Stress (Sat) psi | Allowable Pitting Stress (Sac) psi |
|---|---|---|---|
| 1 | Flamed Or Induction Hardened | 22,000 (0.15 GPa) | 170,000 (1.17 GPa) |
| 2 | Flamed Or Induction Hardened | 55,000 (0.38 GPa) | 190,000 (1.31 GPa) |
| 3 | Carburized and hardened | 75,000 (0.52 GPa) | 275,000 (1.89 Pa) |

It is clear that the values we are using for the prototype are much lower than any value in Table 4; this should lead to lower cost. In a future design, one might want to look at the benefits of using a Pinion Gear with higher values than those of Table 3. The benefits could be a longer life-cycle for the Pinion, which has a higher chance of failure via fatigue and deformation due to the fact that its teeth are the most repeatedly in mesh than any other gear in the gear train (Klebanov p. 170-173). Also, one might want to look at Nylon (or other plastic material) for use as material of the Large Star Gear. The principal benefits of this would be a possible reduction of audible noise of the gear train and slight reduction in weight of the system. A downside of this is that a plastic gear deforms more easily, but since a tooth from the Large Star Gear is less repeatedly in mesh than a tooth from the Pinion, this might not be a problem.

When designing a gear train, there are many stress correction factors that can be looked at, but not all of them are needed in every design situation. Because the Spin Actuator functions at low rotating speeds and the gears under consideration should be of low cost, only a few correction factors were used. The correction factors considered, along with an explanation for their consideration, are shown in TABLE 7 below.

TABLE 7

Stress Correction Factors Used

| Correction Factor | Symbol | Value | Explanation |
|---|---|---|---|
| Dynamic Factor | kv | 1.6 | Budynas (p.750) shows a graph where for low speeds and low gear Grade (quality), the dynamic factor is around 1.6. |
| Load Distribution Factor | km | 2.2 | Bandaru (p. 30) has a table where he states that for: "Combinations of mounting properties and gearing precision that produces less than full face contact," the large value of 2.2 should be used. Because we are after low cost, while still meeting the MediGLIDER bed torque demand, this lower level of precision should be acceptable. |
| Elastic Coefficient | cp | 1840 psi | This is the elastic coefficient for steel-on-steel gear meshing. The value used by B/T (p. 42) is 2300 psi. Here, 0.8 of that value is being used to account for the possibility of a lower coefficient for cast or molded steel gears. |
| Geometric factor-bending | J | 0.28 | The AGMA Information Sheet shows that for a 25 degree pressure angle (with no helical angle), these values are the average for the presented prototype's gears. |
| Geometric factor-pitting | I | 0.1 | |

If more information is needed about these correction factors, one can look at Bandaru/Tesar (p. 26-38), Chapter 14 of Budynas, and the AGMA Information Sheet 908-B89.

With these correction factors and the geometry of the gears already calculated, pages 55 to 60 in Bandaru/Tesar help calculate the Tangential Load, Bending Stress, and Contact Stress at each mesh. For this prototype, these values were calculated when there is a 10 ft.-lb. torque required at the output:

TABLE 8

Gear Train Loads and Stresses for 10 ft.-lbs. Demand

| Parameter | Value |
|---|---|
| $1^{st}$ Mesh Tangential Load | 6.25 lbs. |
| $2^{nd}$ Mesh Tangential Load | 15 lbs. |
| $1^{st}$ Mesh Bending Stress | 7,857 psi. |
| $2^{nd}$ Mesh Bending Stress | 10,607 psi. |
| $1^{st}$ Mesh Contact Stress | 9,097 psi. |
| $2^{nd}$ Mesh Contact Stress | 14,093 psi. |

Every stress value in TABLE 8 is much smaller than any commonly used value from Table 6. With this, the clear argument for low cost can be made.

The programming documentation for every calculation done in this document (and while prototyping this actuator) can be found in the Star Compound Gear Actuator Programming Documentation.

The programming documentation explains in more detail, but when prototyping, it is advised to first start with a relatively broad picture of some inputs and requirements, and as one moves ahead with the process, to narrow down inputs as much as possible.

For this actuator prototype, initially a broad look was given at the estimated gear mesh diameter (which gives a relative sense of the volume), and the reduction ratio (which gives a relative sense of the prime mover needed) as inputs. The output was rated torque to see if the hospital bed demands could be met. This was mapped out.

Figure 27:
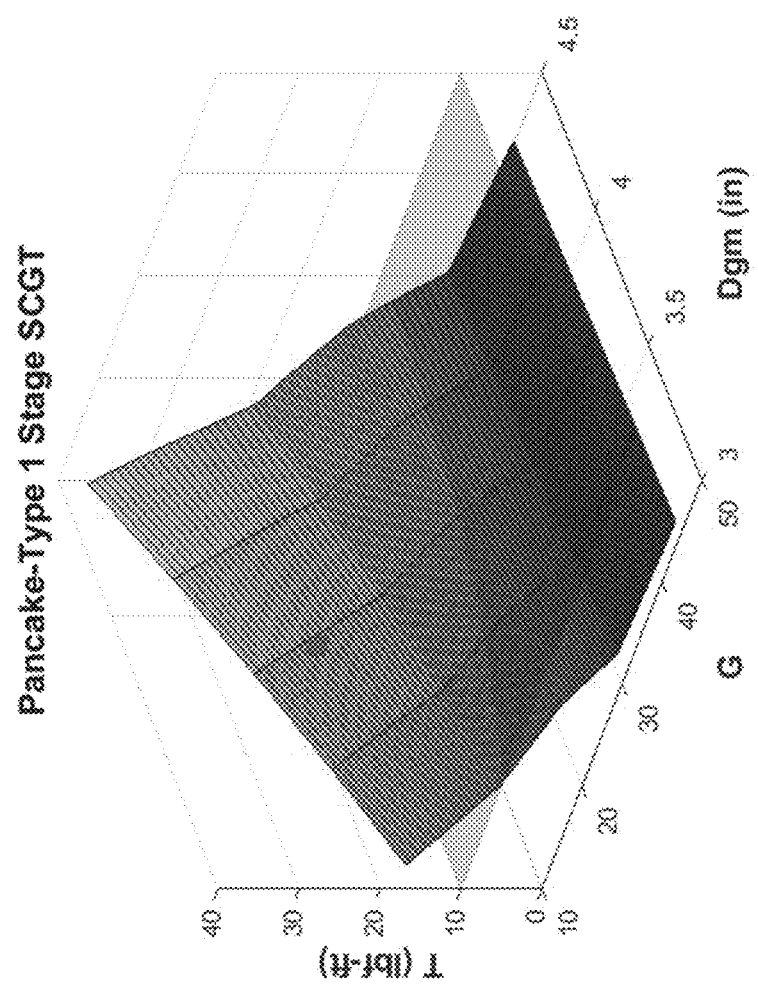
FIG. 27 is an initial prototype map for a spin actuator.
Figure 28:
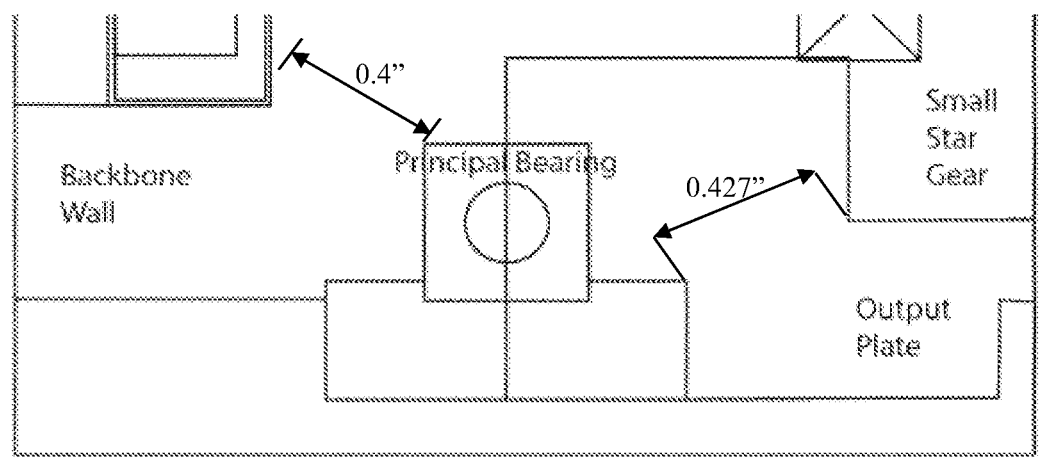

FIG. 27 was an initial look at what the prototype could be. The gray plane at T=10 ft.-lbs. shows that there are many solutions which could be used, various gear reduction ratios and various gear mesh diameters. However, when decisions about appropriate gear pitch diameters, face widths, and use of a simple prime-mover was made, the number of options decreased significantly. As more refinement in parameter values were made, less data was being outputted. At this point, instead of working with Maps, the data was printed out of the program into Excel-like sheets to make decisions with refined outputs.

The red dot in FIG. 27 shows the final solution being used in this prototype. To keep computational time down, this final solution was not calculated in the initial Map. However, as parameters became refined, this solution was found.

It should be noted that a "refined" parameter does not mean a single value, but a range in which a value can fall under. However, as one progresses in the prototyping process, parameters can be given single values.

A more careful look is needed to the Geometric Factors I and J found in the AGMA Information Sheet. This information sheet offers standard practices to avoid undercutting between meshing gears and how to thin a gear's thickness to allow for backlash. This careful look will result in small changes to gear's addendum, deddendum, tooth thickness, I, and J values. This will also lead to a very small change in Rated Torque and stress levels, but most importantly, this will make sure the gears mesh adequately.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. An actuator, comprising:
a stationary frame;
an output plate disposed within said stationary frame;
a top plate;
a stator disposed between said stationary frame and said top plate, said stator describing an annulus;
a rotor disposed within the annulus of said stator;
a principal bearing disposed between said stationary frame and said output plate;
a pinion gear; and
a first star gear which meshes with said pinion gear.

2. The actuator of claim 1, further comprising a second star gear which meshes with said output plate.

3. The actuator of claim 2, wherein said pinion gear also meshes with said second star gear.

4. The actuator of claim 1, wherein said rotor includes a rotor disk disposed between said stator and said first star gear.

5. The actuator of claim 1, wherein said output plate forms an external surface of said actuator.

6. The actuator of claim 1, wherein said output plate and said top plate form first and second opposing external surfaces of said actuator.

7. The actuator of claim 1, wherein said first star gear which meshes with said pinion gear at a reduction ratio of 4.

8. The actuator of claim 2, wherein said second star gear which meshes with said pinion gear at a reduction ratio of 4.

9. The actuator of claim 2, wherein said first star gear and said second star gear have an amplification factor of at least 2.4.

10. The actuator of claim 1, further comprising:
a wire channel which extends along a rotational axis of said output plate.

* * * * *